(12) United States Patent
Miyajima et al.

(10) Patent No.: US 6,453,872 B1
(45) Date of Patent: Sep. 24, 2002

(54) FUEL INJECTION VALVE AND INTERNAL COMBUSTION ENGINE MOUNTING THE SAME

(75) Inventors: Ayumu Miyajima, Chiyoda; Yoshio Okamoto, Minori; Yuzo Kadomukai, Ishioka; Shigenori Togashi, Abiko; Kiyoshi Amo, Chiyoda; Makoto Yamakado, Tsuchiura; Tohru Ishikawa, Kitaibaraki; Hiromasa Kubo, Yokohama; Hiroshi Fujii, Tokyo, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/528,180

(22) Filed: Mar. 17, 2000

(30) Foreign Application Priority Data

Mar. 17, 1999 (JP) .......................................... 11-071412
Dec. 15, 1999 (JP) .......................................... 11-355502

(51) Int. Cl.[7] ................................................. F02B 3/00
(52) U.S. Cl. ...................... 123/298; 123/123; 123/295; 239/533.12
(58) Field of Search ................................ 123/298, 295, 123/305, 306, 470, 467, 468; 239/533.12, 533.2, 463

(56) References Cited

U.S. PATENT DOCUMENTS

| | | | | |
|---|---|---|---|---|
| 5,740,777 A | * | 4/1998 | Yamamoto et al. | 123/305 |
| 6,092,743 A | * | 7/2000 | Shibata et al. | 129/533.12 |
| 6,095,113 A | * | 8/2000 | Nogi et al. | 123/295 |
| 6,125,818 A | * | 10/2000 | Okamoto et al. | 123/305 |

FOREIGN PATENT DOCUMENTS

JP 6146886 5/1994

* cited by examiner

Primary Examiner—Willis R. Wolfe
Assistant Examiner—Mahmoud Gimie
(74) Attorney, Agent, or Firm—Antonelli, Terry, Stout & Kraus, LLP

(57) ABSTRACT

At an outlet portion of an injection hole (8) of a fuel injection valve (1), through removal of a part (A1, 7B) of a wall forming the injection hole (8), a restriction to a spray flow is eliminated, thereby, a deflection of the spray occurs in which the spray is rich at the side where this restriction is released and is lean at the side that is restricted. Thus, the ignition property of an internal combustion engine is improved, and an optimum spray is realized which reduces the amount of unburnt gas components being exhausted.

65 Claims, 14 Drawing Sheets

| SECTION | A - B | B - C |
|---|---|---|
| FUEL RELEASE PORTION (WITHIN PLANE PEPENDICULAR TO J AXIS) | NO | PISTON ←⌒→ PLUG<br>SEMICIRCLE (CONSTANT) |
| SPRAY INJECTION STATE (SPRAY SHAPE SEEN FROM N) | NO SPRAY | PISTON ←▧→ PLUG |

FUEL INJECTION VALVE AND INTERNAL COMBUSTION ENGINE MOUNTING THE SAME

BACKGROUND OF THE INVENTION

1. Field of the Invention

The present invention relates to a fuel injection valve which injects fuel into an internal combustion engine, and relates to an art for forming an excellent fuel spray with regard to ignition property and combustion property.

2. Conventional Art

As an alternative of an in-intake manifold fuel injection device which injects fuel into an intake manifold of an internal combustion engine, an in-cylinder fuel injection device is known which injects fuel directly into a combustion chamber.

JP-A-6-146886(1994), for example, discloses such in-cylinder gasoline injection engine. In this conventional art, with consideration with regard to attachment position of a fuel injection valve and with formation of an intake flow of vertical swirl (tumble flow) in a combustion chamber through an intake port extending upward from an intake opening end, combustion is performed stably with leaner fuel than that at stoichiometric air fuel mixture and fuel economy is improved.

However, the above conventional art did not necessarily take into account fully of a spray shape or a spray structure which can improve both an ignition property (firing property) and a combustion property (reduction of unburnt gas exhaust amount), which will be explained hereinbelow.

In order to optimize a spray injected from a fuel injection valve, it is necessary to take into account of the following characteristics. First one is a spray shape of which influence factors are a spreading angle of the spray and a reaching distance thereof. Second one is a spray particle diameter, in that it is necessary to uniformalize the particle diameter distribution while reducing number of particles having large diameters as much as possible. Third one is a spray structure which is required to optimize a space distribution of the sprayed fuel particles.

As a result of experimental analysis and study with regard to how these spray characteristics affect combustion characteristics for the internal combustion engine, the followings are clarified. In order to improve an ignition property, it is effective to increase fuel particle distribution around an ignition unit and to enhance distribution of air fuel mixture of combustible density. On the other hand, if a fuel particle distribution in a piston direction is reduced, unburnt gas components (HC, CO) in the fuel tend to decrease, thereby, the combustion property is improved. Further, in order to obtain a combustion stability over a broad range from a low engine rpm to a high engine rpm, it is preferable that the spray shape does not vary by a variation of pressure in the cylinder. This is because since the geometric positional relationship between a fuel injector and an ignition unit is fixed, in order to always supply a fuel spray of a proper density to the ignition unit it is important to keep the fuel spray expansion constant. In other words, a fuel spray injected by a conventional fuel injector tends to spread, when pressure in a cylinder is low and tends to be collapsed, when the pressure in the cylinder is high. Therefore, if the arrangement of the fuel injector and the ignition unit is determined with reference to a comparatively high pressure condition of the cylinder, the fuel tends to deposit on an upper and side cylinder face in the cylinder or on a piston head, when the pressure in the cylinder lowers, on the other hand, if a comparatively low pressure condition in the cylinder is selected as a reference, it tends to be difficult to reach fuel spray suitable for combustion to the ignition unit when pressure in the cylinder rises.

SUMMARY OF THE INVENTION

The present invention is to provide a fuel injection valve and an internal combustion engine mounting the same which improves the ignition property of the internal combustion engine and realizes a fuel spray suitable to reduce the exhaust amount of unburnt gas components at the time of the combustion.

In order to achieve the above object, a fuel spray is produced of which shape is hardly varied with respect to pressure variation in the cylinder. For this purpose, such a fuel spray is generated that the air fuel mixture toward the ignition unit is converged and fuel particles toward a piston is leaned. At this instance, air outside the spray is introduced into the spray from portions where the fuel particles is leaned (or where fuel molecules are exhausted). Thereby, a pressure difference between outside and inside the spray can be reduced which makes difficult to collapse the spray.

Specifically, at an outlet port of an injection hole which is provided at a fuel injection valve and is for injecting fuel, through removing a part of a wall face forming the injection hole it is preferable that a restriction to a spray flow is released and a deflecting spray is formed in which the spray at the side where the restriction is released is rich and that at the side restricted is lean. In this instance, it is also preferable to vary the restriction force non-linearly.

In an internal combustion engine, it is preferable to arrange the above fuel injection valve in such a manner that a rich spray is formed at the side of the ignition unit and a lean spray is formed at the side of the piston.

BRIEF DESCRIPTION OF THE DRAWINGS

FIGS. 2A and 2B show enlarged views of a nozzle member 7 of the solenoid type fuel injection valve 1 as shown in FIG. 1, wherein FIG. 2A is a vertical cross sectional view of the nozzle member 7 and FIG. 2B is a plane view of the nozzle member 7 in FIG. 2A seen along arrowed direction N;

FIG. 3B is a lateral cross sectional view of the spray taken along a cross sectional plane X—X in FIG. 3A and seen along an arrow N, and FIG. 3C is a schematic view of an internal combustion engine in which the fuel injection valve of the present invention is applied to, wherein fuel is directly injected into a combustion chamber (cylinder);

FIG. 4B is a schematic view showing a shape of fuel released portion and a spray cross sectional configuration;

FIG. 5B is a photograph of laterally cross sectioned view of the spray taken along the sectional plane X—X and seen along arrow N in FIG. 5A;

FIG. 6B and 6C are graphs showing flow rate distributions along axis lines defined in FIG. 6A;

FIGS. 7A, 7B, 7C and 7D show enlarged views of a nozzle members 7 in other embodiments according to the present invention, wherein FIGS. 7A and 7C show vertical cross sectional views of the respective nozzle members 7, FIG. 7B is a plane view of the nozzle member 7 as shown in FIG. 7A and seen along the arrowed direction N, and FIG. 7D is a plane view of the nozzle member 7 as shown in FIG. 7C and seen along the arrowed direction N;

FIGS. 8A and 8B show enlarged views of a nozzle member 7 in still another embodiment according to the present invention wherein FIG. 8A is a vertical cross sectional view of the nozzle member 7 and FIG. 8B shows a plane view of the nozzle member 7 as shown in FIG. 8A and seen along the arrowed direction N;

FIGS. 9A, 9B and 9C show an embodiment of an internal combustion engine according to the present invention, wherein FIG. 9A is a vertical cross sectional view, FIG. 9B is a schematic view of the combustion chamber as shown in FIG. 9A and seen along the arrow P, and FIG. 9C is a schematic view of the piston head as shown in FIG. 9A and seen along the arrow P;

FIGS. 10A and 10B show another embodiment of an internal combustion engine according to the present invention, wherein FIG. 10A is a vertical cross sectional view of the internal combustion engine, and FIG. 10B is a schematic view of the piston head thereof seen along the arrow P;

FIGS. 12A and 12B show enlarged views of a nozzle member 7 in a further embodiment of a fuel injection valve according to the present invention, wherein FIG. 12A is a vertical cross sectional view thereof and FIG. 12B is a plane view of FIG. 12A and seen along the arrowed direction N;

FIGS. 15A and 15B show enlarged views of a nozzle member 7 in a further embodiment of a fuel injection valve according to the present invention, wherein FIG. 15A is a vertical cross sectional view thereof and FIG. 15B is a plane view of FIG. 15A seen along the arrowed direction N.

DETAILED DESCRIPTION OF THE EMBODIMENTS

Figure 1:
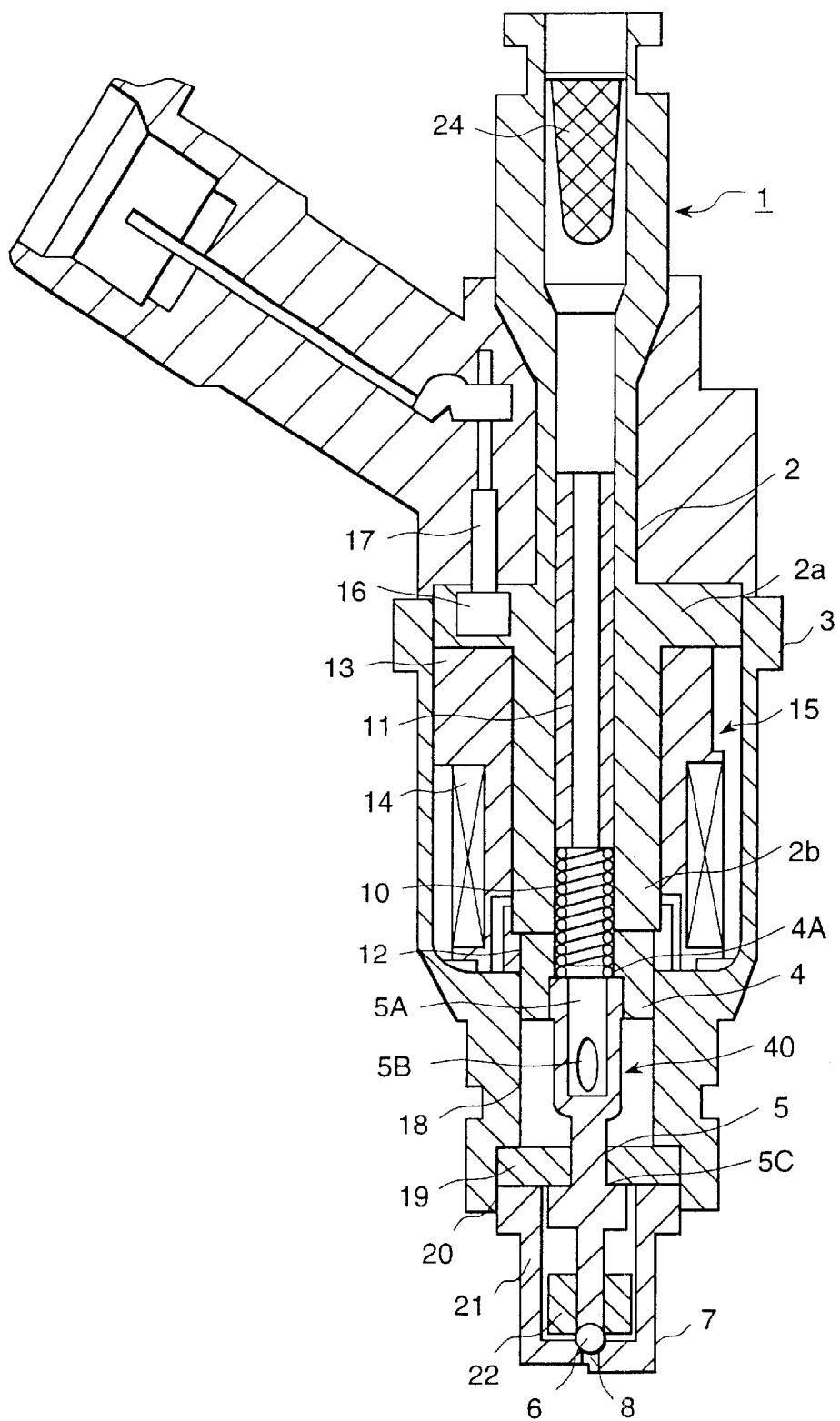
FIG. 1 is a vertical cross sectional view of a solenoid type fuel injection valve representing one embodiment of the present invention.

An embodiment of the present invention will be explained with reference to FIG. 1 through FIG. 6C. Hereinbelow, a plane which includes a valve axial line (valve axial center) and in parallel with the valve axial line is called as vertical cross sectional plane, and a plane perpendicular to the valve axial line is called as lateral cross sectional plane.

A solenoid type fuel injection valve 1 performs fuel injection through opening and closing of a seat portion thereof by ON-OFF duty signals calculated by a control unit. A magnetic circuit is formed by a yoke 3, a core 2 including a plug body portion 2a closing an opening end of the yoke 3 and a column shaped portion 2b extending through a center portion of the yoke 3 and an anchor 4 facing the core 2 with a gap. At the center of the column shaped portion 2b a hole 4A is provided for retaining a spring 10 functioning as an elastic member through which a valve body 40 constituted by the anchor 4 made of a magnetic material, a rod 5 and a ball 6 joined to the rod 5 is pressed onto a seat face 9 in such a manner to insert the same thereinto. The seat face 9 is formed at a nozzle member 7 together with an injection hole 8 so as to locate at the upstream side of the injection hole 8. The upper end of the spring 10 contacts to the bottom end of a spring adjuster 11 which is inserted in the center of the core 2 so as to adjust a set load. At a gap facing between the side of column shaped portion 2b of the core 2 and the side of the valve body 40 of the yoke 3, a seal ring 12 is provided which is mechanically fixed therebetween so as to prevent fuel from flowing out to the side of a coil 14. The coil 14 which excites the magnetic circuit is wound around a bobbin 13, and the outer circumferential thereof is molded by a plastic material. A terminal 17 of a coil assembly 15 formed by the above elements is inserted into a hole 16 provided at the plug body portion (a flange) 2a of the core 2. The terminal 17 is coupled to a terminal of a control unit not shown.

At the yoke 3, a plunger receiving portion 18 is formed by cutting out so as to receive the valve body 40, and further a nozzle receiving portion 20 of which diameter is larger than that of the plunger receiving portion 18 is provided as a through hole up to the top end of the yoke 3 for receiving a stopper 19 and the nozzle member 7. At the side of the anchor 4 of the rod 5 a hollow portion 5A which permits fuel passage is provided. The hollow portion 5A is provided with a fuel flow out port 5B. The axial movement of the valve body 40 is guided through contact of the outer circumference of the anchor 4 with the inner circumference of the seal ring 12 as well as the ball 6 or the vicinity of the end at the side of the ball 6 of the rod 5 is also guided by an inner circumferential face 23 of a fuel swirl element 22. The fuel swirl element 22 is inserted in a center hollow portion formed in the nozzle member 7 and is positioned while contacting with an inner wall 21 thereof at the upstream side of the seat face 9. In the present embodiment, the nozzle member 7 is constituted by a single piece member so as to include a cylindrical side wall portion (circumferential wall portion) 72 and an end face (bottom face) 71. In this instance, the nozzle member 7 constitutes a housing which accommodates the fuel swirl element 22 and a part of the valve body 40.

Further, the stroke (amount of movement upward along the axis in FIG. 1) of the valve body 40 is set by a gap between a receiving face 5C of a neck portion of the rod 5 and the stopper 19. Still further, a filter 24 is provided for preventing invasion of dust and foreign matters in the fuel or in the pipe lines on the side of the valve seat between the ball 6 and the seat face 9.

Now, the nozzle member 7 having a structure including L shaped cut out face according to the present embodiment will be explained with reference to FIG. 2.

The injection hole 8 is formed in such a manner that the center thereof coincides with the axial line (valve axial center) J of the valve body 40 and the wall face thereof is in parallel to the axial line J. At a nozzle top end face 7A where an outlet opening of the injection hole 8 is formed the L shaped cut out portion is formed which is constituted by a face 7B perpendicular to the axial line J and a face A1 substantially parallel to the axial line J. In this instance, the L shaped cut out portion is configured as follows; the width of the injection hole 8 of the cut out portion is W, the length of the injection hole 8 at the most deeply cut out portion is L and the length of the injection hole 8 of the portion not cut out (the least cut out portion) is L", and the top end face of the nozzle member 7 is constituted by the two plane faces 7A and 7B perpendicular to the axial line J and formed so as to sandwich the injection hole 8 and by a face A1 parallel to the axial line J and connecting these two plane faces 7A and 7B.

With the above structure, the outlet opening face of the injection hole 8 is formed so as to includes a step on the plane faces 7A and 7B disposed with a step.

It is preferable that the above cut out portion varies restriction force to a fuel spray non-linearly with respect to circumferential direction of the injection hole 8. It is further preferable to increase the non-linearity in the restriction force variation through a step shaped restriction force variation, in that with the above step portion the restriction force variation is non-linearized. Therefore, the fuel injection valve according to the present embodiment is generalized as having the following structures, (1) Two cross points, which are formed by a cross sectional plane including the center axial line of the injection hole 8 and in parallel with the center axial line and by the periphery forming the outlet opening of the injection hole 8, are offset in the direction along the center axial line as well as a step is formed at the periphery forming the outlet opening on the way from one of the cross points to the other.

(2) At this instance, two peripheries forming the outlet opening in the way from the respective two cross points to the corresponding step portions are aligned substantially in parallel when seen from a direction perpendicular to the above cross sectional plane.

(3) Further, the peripheries forming the outlet opening are formed so as to vary in the direction along the center axial line at the step portions.

(4) The outlet port face of the injection hole 8 is formed so as to include a step in the center axial direction of the injection hole 8.

(5) A step is provided at the outlet opening portion of the injection hole 8 so that the length of the passage wall forming the injection hole 8 varies non-linearly in the circumferential direction of the injection hole 8.

(6) At the outlet opening of the injection hole 8, a cutting substantially in parallel with the center axial line of the injection hole 8 is formed, and through removing a wall face of one side with respect to the cutting the step is formed.

(7) Through the formation of a step at a nozzle top end face where the outlet opening of the injection hole 8 is formed, the step is formed at the outlet opening face.

(8) At the periphery forming the outlet opening for the injection hole 8, a step is formed in the center axial direction of the injection hole 8 so that the length of the passage wall face forming the injection hole 8 varies in the circumferential direction of the injection hole 8 and the fuel is injected while being provided a pressure of 1.0~20 MPa at a fuel inlet portion to the fuel injection valve.

Figure 2A:
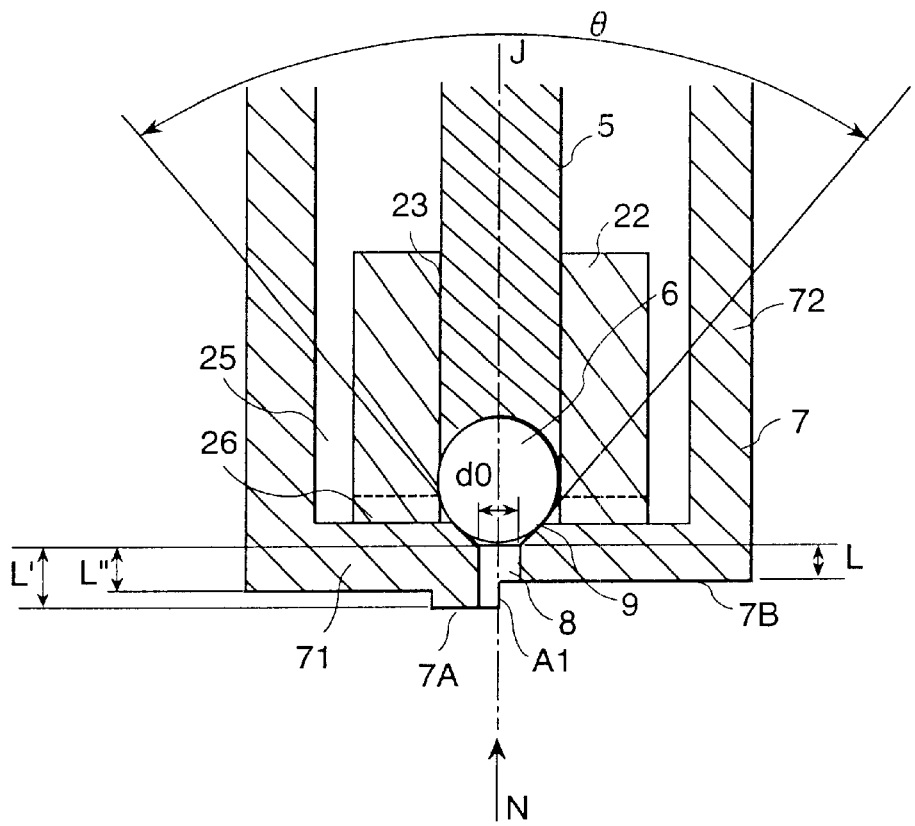

In the structure as shown in FIG. 2A, the spray formed therein has the following features.

(a) At the cut out side of the passage wall forming the injection hole 8, a distribution amount of the spray (distribution amount of the air fuel mixture) is increased.

(b) Since the kinetic energy of the spray injected from the cut out side is large, the particle diameters of the spray become small.

With regard to advantages of (a) and (b) above, the firing property of the fuel is improved and the fuel economy is enhanced.

In the above structure, the "cut out" such as in connection with the cut out face Al never limits the processing method thereof, and simply implies a shape in which a part thereof is removed. Processing methods such as a press working (plastic working) using a mold material and a casting can be used therefor. Above is also true with respect to the following embodiments. Further, the ball 6 can not necessarily be a spherical shape, namely the ball 6 can be a conical shape or a needle shape.

Figure 2B:
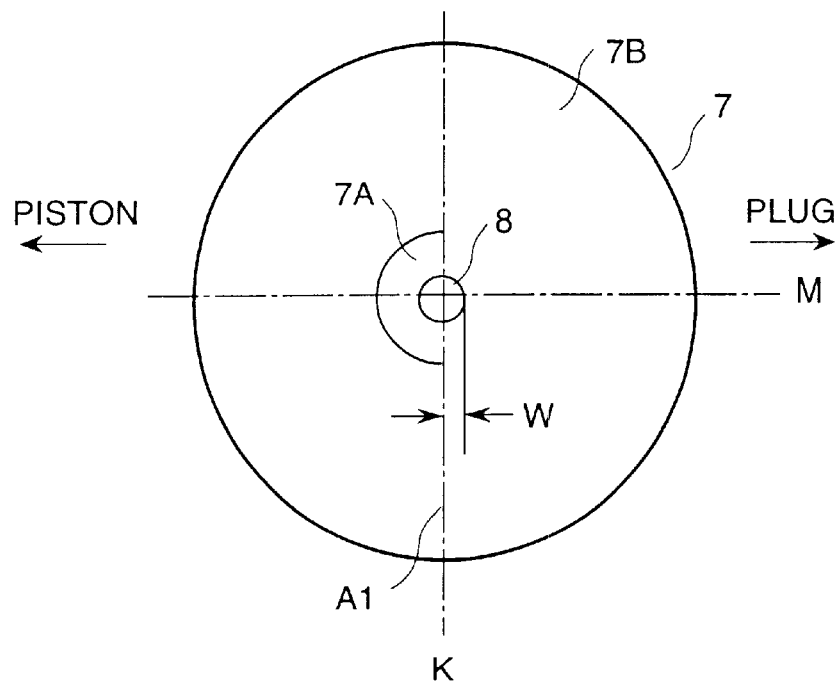

FIG. 2B defines a diameter do of the injection hole 8, a seat angle θ, an arrow "PLUG", an arrow "PISTON" and lines K and M. The line K represents a line which passes the center of the injection hole 8 and is in parallel with the cut out face A1, the line M represents a line which passes the center of the injection hole 8 and is perpendicular to the line K, and the arrow "PLUG" and the arrow "PISTON" are in parallel with the line M.

Further, in FIG. 2A, the fuel swirl element 22 is provided with axial direction grooves 25 formed by setting in a plane of the outer circumferential portion of the fuel swirl element 22 and with radial direction grooves 26. In the present embodiment, although the axial direction grooves 25 are formed in a plane, however, other shapes such as an annular passage can be used. The axial direction grooves 25 and the radial direction grooves 26 form passages for fuel introduced upward from the fuel swirl element 22, however, the fuel passed through the axial direction grooves 25 is introduced while being deflected from the axial center by the radial direction grooves 26 and is provided with a swirl which functions to promote atomization of the fuel when the same is injected by the injection hole 8 provided at the nozzle member 7. Herein, a swirl strength (a swirl number S) provided by the fuel swirl element 22 is determined by the following equation.

$$S = \text{(angular momentum)}/\text{(momentum in injection axis direction)} \times \text{(injection hole radius)} = (2 \cdot d_0 \cdot LS)/(n \cdot d_s 2 \cdot \cos(\theta/2))$$

Herein, $d_o$: diameter of injection hole $L_s$: deflection amount of groove (distance between valve axial center and groove (width) center)

n: number of grooves

θ: angle of valve seat $d_s$: flow dynamics equivalent diameter represented by groove width and groove height = 2·W·H/W+H When the swirl number S is increased, the atomization is promoted and the spray is dispersed.

An operation of the fuel injection valve 1 of the present embodiment will be explained hereinbelow. When an electric signal is applied to the coil 14, a magnetic circuit is formed through the core 2, yoke 3 and the anchor 4, and the anchor 4 is attracted to the side of the core 2. When the anchor 4 moves, the ball 6 removes from the seat face 9 and the fuel passage is opened.

The fuel flows in inside the fuel injection valve 1 from the filter 24, and through an inner passage of the core 2, an outer circumferential portion of the anchor 4, the hollow portion 5A which is provided inside the anchor 4 so as to permit fuel passage and the fuel flow out port 5B, the fuel runs to the downstream, then the fuel is supplied to the seat portion while swirling through a gap between the stopper 19 and the rod 5, the axial direction fuel passages 25 and the radial direction fuel passages 26.

Now, a spray structure obtained by the fuel injection valve 1 according to the present embodiment will be explained with reference to FIG. 3A through FIG. 6C.

Figure 5A:
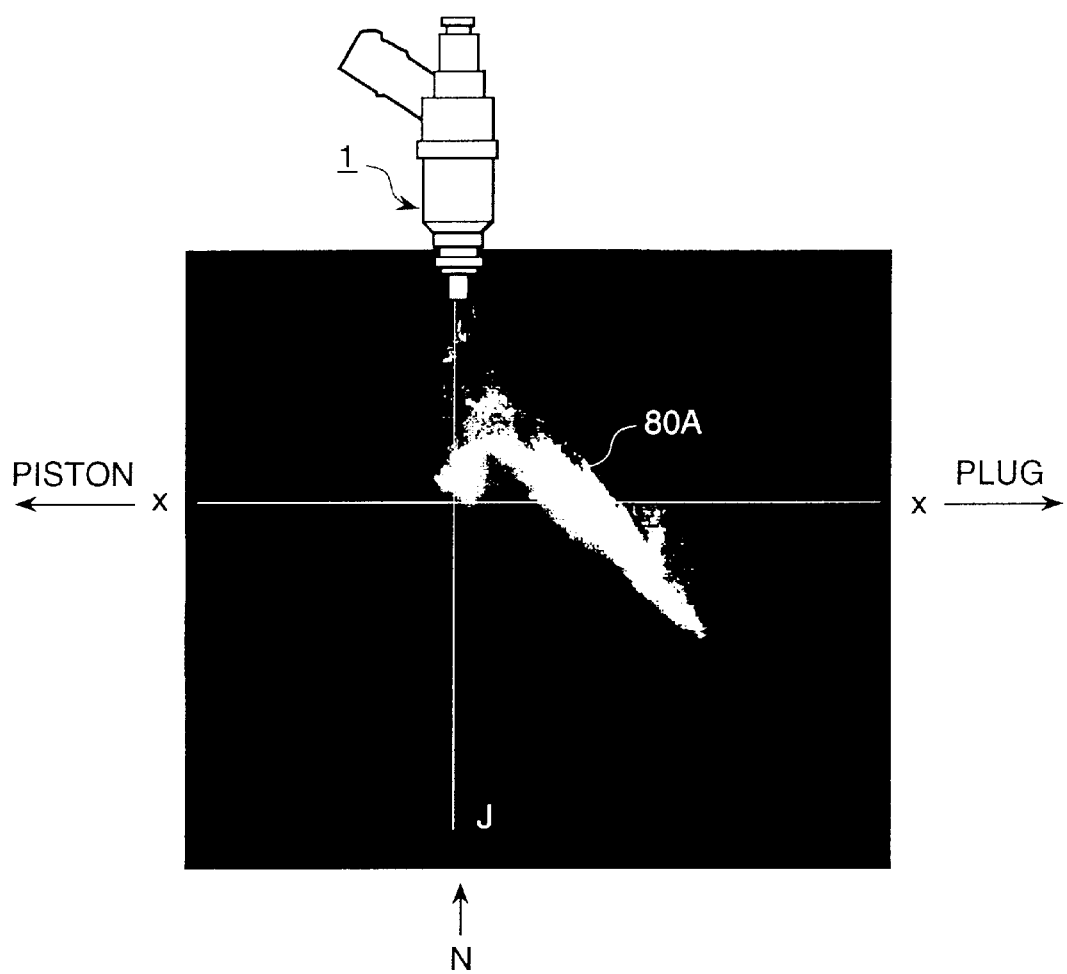
FIGS. 5A–5B is a photograph of a vertically cross sectioned spray, when the fuel injection valve according to the present invention injects fuel into atmosphere.
Figure 5B:
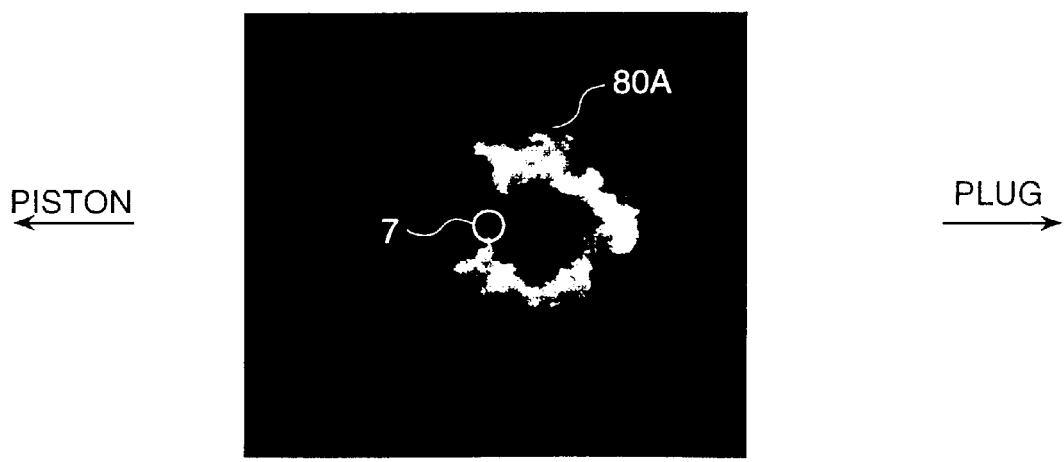

FIGS. 5A and 5B are an example of experimental result in which a spray injected by the fuel injection valve 1 according to the present embodiment is photographed. The experimental condition is that the fuel pressure is about 7 MPa under an atmospheric condition. For photographing the spray in vertical cross section, a laser beams are irradiated to the spray while setting the laser sheet beams so as to form a plane including the valve body axial line J, and an image of a spray at 2~3 ms after the fuel injection was photographed by a camera. Likely, for photographing the spray in lateral cross section the photographing was performed while setting the laser sheet beams so as to form a X—X plane perpendicular to the valve body axial line J. As shown in the drawings, the vertical and lateral cross sections of the spray injected from the fuel injection valve 1 according to the embodiment are deflected to the side of arrow "PLUG", and the air fuel mixture of combustible density is rich at the deflection side, on the other hand, at the side of arrow "PISTON", the spray assumes the distribution as shown by the region 80A where the air fuel mixture of combustible density is leaned.

Figure 6A:
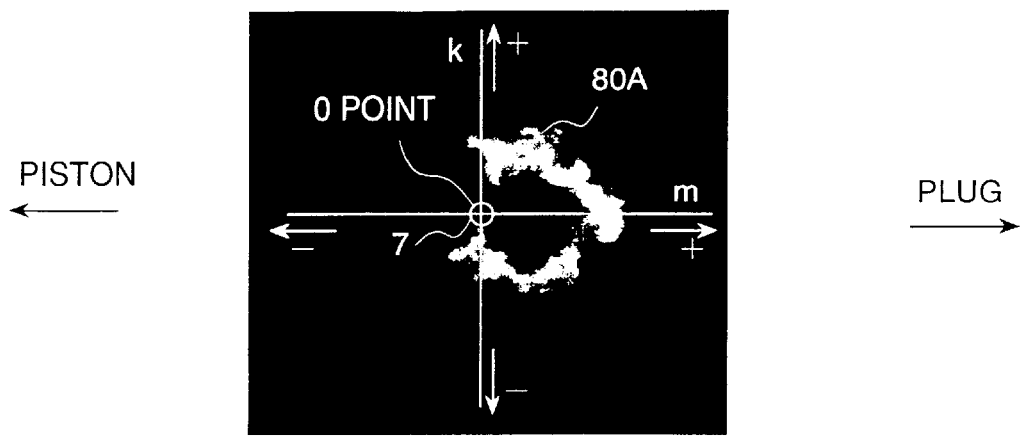
FIGS. 6A–6C is a photograph of a vertically cross sectioned spray, when the fuel injection valve according to the present invention injects fuel into atmosphere.
Figure 6B:
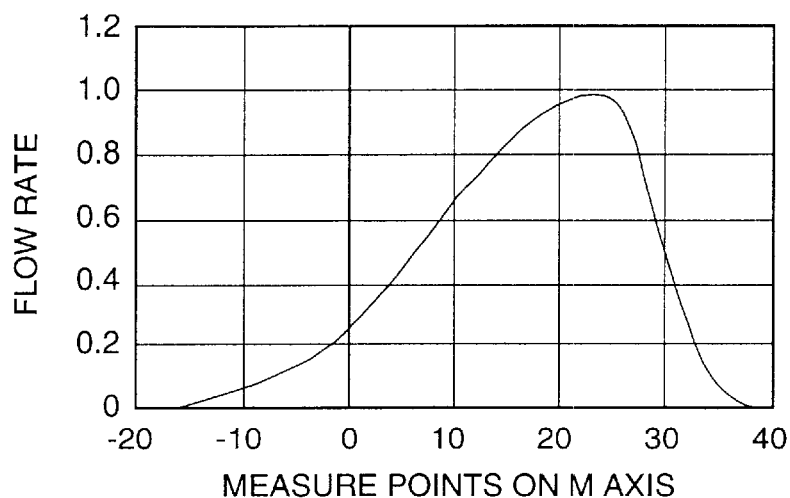
Figure 6C:
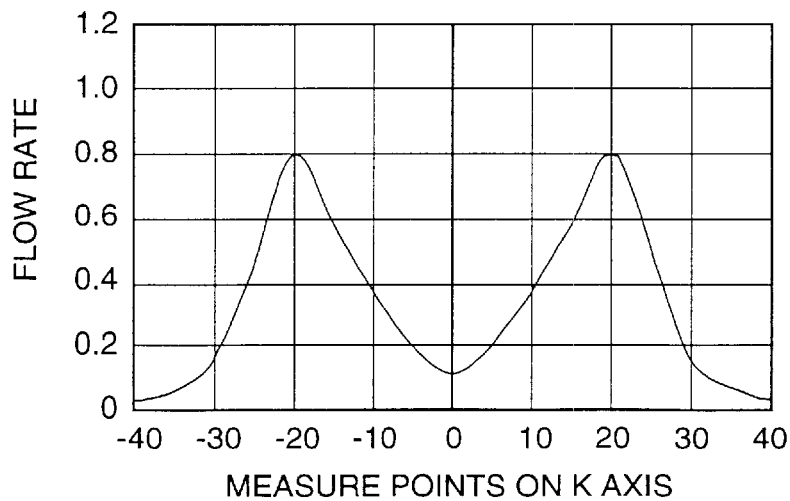

FIGS. 6A, 6B and 6C are diagrams showing an example of flow rate distribution of a spray injected by the fuel injection valve 1 according to the present embodiment. FIG. 6A shows an example of a spray cross section of which flow rate distribution was measured. FIG. 6B shows a flow rate distribution on line m defined in FIG. 6A, and FIG. 6C shows a flow rate distribution on line k defined in FIG. 6A. The experimental condition was as same as that in FIGS. 5A and 5B. The abscissas in FIGS. 6A and 6B represent measurement points respectively on lines m and k, and the ordinates thereof have no dimension while assuming the maximum flow rate as 1. As shown in FIG. 6B, the spray is largely distributed at the side of "PLUG" and is distributed less at the side of "PISTON". Further, as shown in FIG. 6C the distribution on line k is substantially symmetric.

Figure 3A:
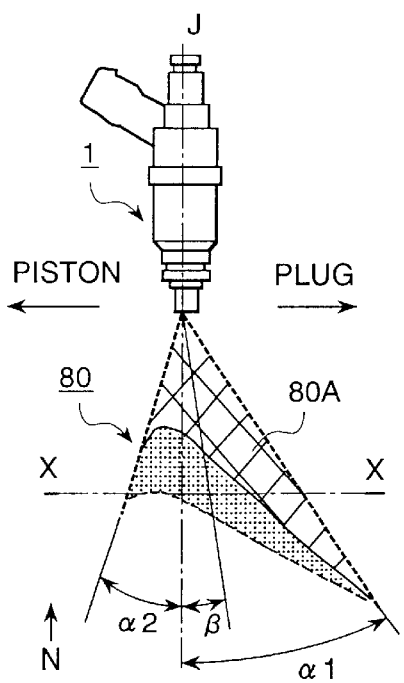
FIGS. 3A–3C shows a view of a spray when a fuel injection valve according to the present invention injects fuel into atmosphere.

As shown in FIG. 3A, the spray injected from the fuel injection valve 1 according to the present embodiment is deflected by a deflection angle 62 toward the side of arrow "PLUG", and at the deflection side the sir fuel mixture of combustible density is rich and at the side of arrow "PISTON" the air fuel mixture in combustible density is lean. The relationship between a spray angle α1 at the side "PLUG" and a spray angle α2 at the side of "PISTON" with respect to the center axial line of the injection hole 8 is α1>α2, thereby, the distribution as shown by a region 80 is resulted. Further, the reaching distance of the fuel spray injected to the side of arrow "PLUG", namely to the side where the outlet of the injection hole 8 is cut out is longer than the reaching distance of the fuel spray injected to the side where the outlet of the injection hole 8 is not cut out. Herein, a vertical cross section of the spray in a plane containing the valve axial line J and in parallel with J assumes a region 80A indicated by net shaped hatchings. Herein, the deflection angle β is determined by the following equation.

$$\beta = (\alpha 1 - \alpha 2)/2$$

Figure 3C:
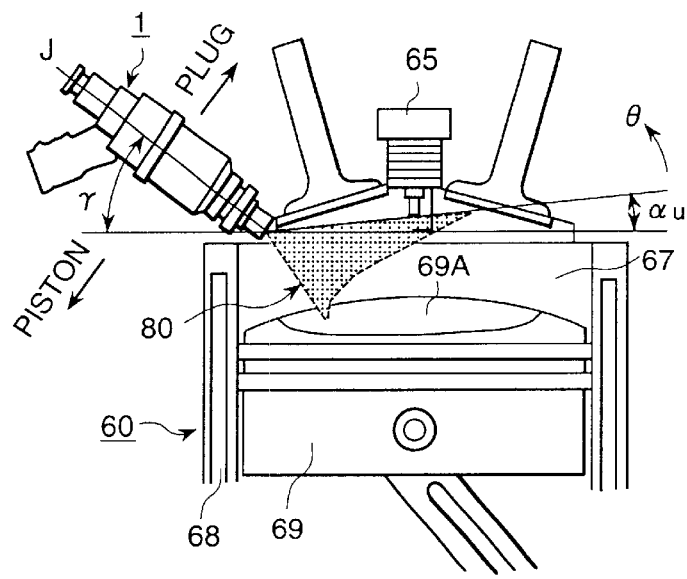
Figure 3B:
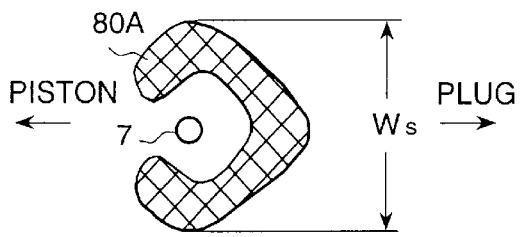

Further, as shown in FIG. 3B, with respect to the spray in X—X lateral cross section seen from direction of arrow, the air fuel mixture in combustible density is rich at the side of arrow "PLUG", and is lean at the side of arrow "PISTON" and in an extreme case a condition occurs in which no fuel particles exists. Namely, as shown by the region 80A a distribution where a part of the spray is cut at the side of arrow "PISTON" is observed. Further, the fuel injection valve 1 according to the present embodiment is attached with an attaching angle γ with respect to the internal combustion engine 60 as well as assuming the arrow directions "PLUG" and "PISTON" as shown in FIG. 3C, the air fuel mixture converges around the ignition unit 65 provided at the internal combustion engine 60, on the other hand, the air fuel mixture around a cavity 69A on the piston 69 reciprocatively disposed in the cylinder 68 becomes lean, and a distribution as showing by the region 80 having a spray upper end angle αu is formed. Namely, the spray angle is large with respect to the side of the ignition unit 65 and is small with respect to the side of the cavity 69A of the piston 69, further, the density of combustible air fuel mixture is rich at the side of the ignition unit 65 and is lean at the side of the cavity 69A of the piston 69, and still further, the reaching distance of the spray is long at the side of the ignition unit 65 and is short at the side of the cavity 69A of the piston 69. Herein, the spray upper end angle αu is defined while assuming the direction of arrow θ as positive. In FIG. 3C, it is assumed that in the combustion chamber 67 there are no gas flow other than the spray and the pressure in the cylinder 68 is substantially equal to the atmospheric pressure.

Figures 4A, 4B:
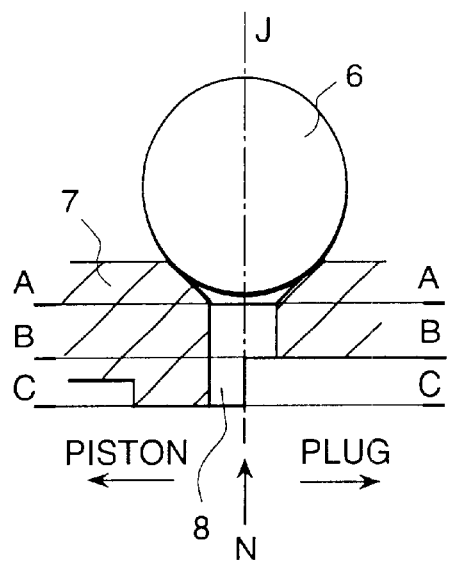
FIGS. 4A–4B is an enlarged view of an injection hole portion of the fuel injection valve according to the present invention.

A comparison with regard to fuel release portion and spray injecting condition will be explained at a section (section A-B) from a cross section A-A to a cross section B-B and at another section (section B-C) from the cross section B-B to a cross section C-C as shown in FIGS. 4A and 4B. At the section A-B, since the fuel is restricted by all circumferences of the injection hole 8, no spray is injected. On the other hand, at the section B-C, the fuel is released in semicircular shape as shown, therefore, the spray is injected to the side "PLUG", but not injected to the side "PISTON", thereby, the cross sectional shape of the spray shows a horseshoe shape where a part of the spray is cut as illustrated. Accordingly, if the pressure in the combustion chamber varies due to movement of the piston 69, the pressures inside and outside the spray likely balances, and the spray is hardly collapsed and the configuration thereof is maintained constant.

In the present embodiment, although the step (L'-L) is to be determined in view of the, inner diameter of the cylinder, namely volume of the engine and an attachment angle of the fuel injection valve, the step is set at least more than 0, further, in order to obtain a substantial variation of the spray structure (an expanding angle, a reaching distance and a spatial distribution) it is preferable to set the step (L'-L) in the following range $0<(L'-L)/d_0 \leq 1$, for an internal combustion engine having an ordinary engine volume of 2~3 liter and an ordinary fuel injection valve attachment angle of 10°~50°.

In the present embodiment, although the projecting portion 7A is formed at the outlet portion of the injection hole 8 on the top end face of the nozzle member 7, the projecting portion 7A is not necessarily provided, in the structure without the projecting portion 7A, the length of the injection hole 8 where no cut out (or portion having the least cut out) is provided assumes L". At this instance, the relationship with regard to length of the injection hole 8 is given as L'>L">L. However, through the provision of the projecting portion 7A a large step (L'-L) can be constituted only with the weight increase of the projecting portion 7A and a further large spray angle α1 (as defined in FIG. 3A) can be realized.

Further, through an adjustment of the injection hole width W, the spray cross section Ws (as defined in FIG. 3B) can be adjusted, in that through decreasing W, Ws can be decreased and through increasing W, Ws can be increased, thereby, W can be set in a range $0<W\leq d_0$.

As has been explained above, by adjusting the size of the step (L'-L), the deflection amount of the spray (the angle α1 or β as shown in FIG. 3A) can be adjusted. Further, by adjusting the range (the range for shortening the passage wall) of removing the passage wall of the injection hole 8 with respect to the circumferential direction thereof, the expansion Ws of lateral cross section of the spray can be adjusted.

The nozzle member 7 can be constituted as shown in FIGS. 7A through 7D.

Figure 7A:
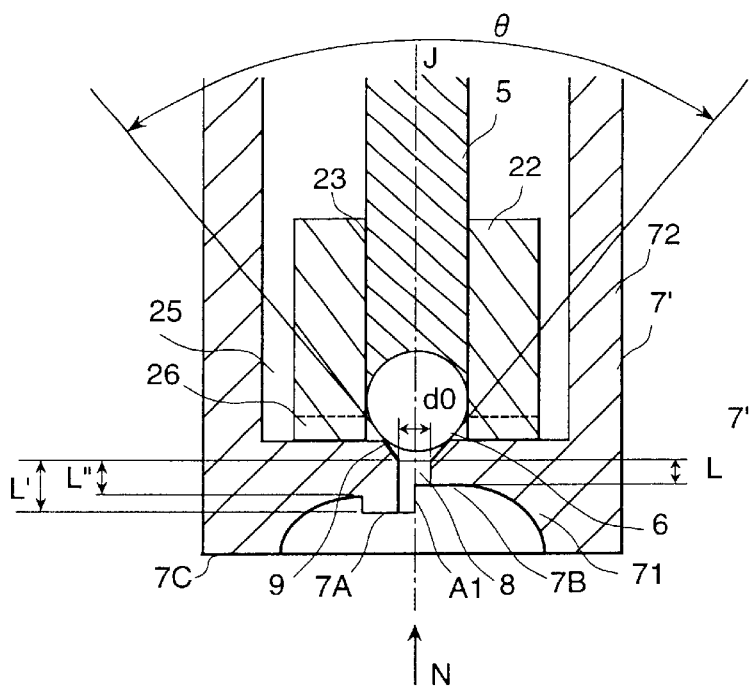
Figure 7C:
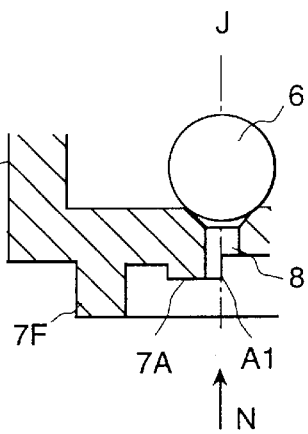
Figure 7B:
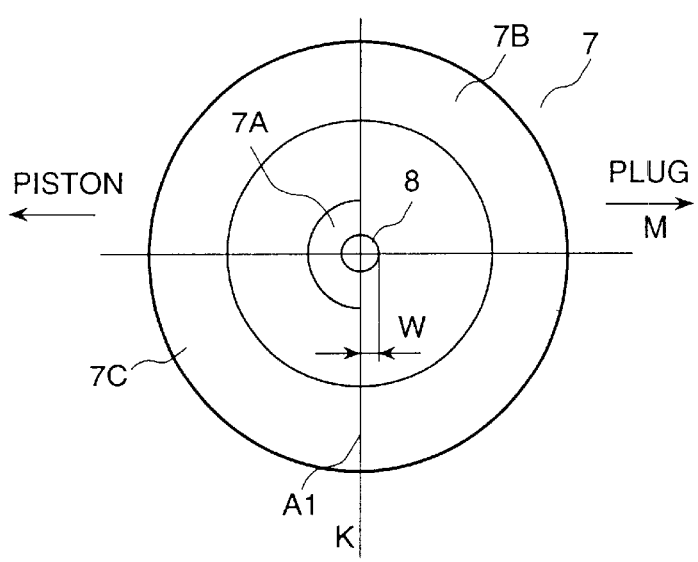

In the nozzle member 7' as shown in FIGS. 7A and 7B, a thick portion 7C is provided around the circumferential portion of the bottom face portion (end face portion) 71 of the nozzle member 7'. Namely, in this instance, by means of the thick portion 7C vibration noises caused when the ball 6 seats on the seat face 9 is reduced.

Figure 7D:
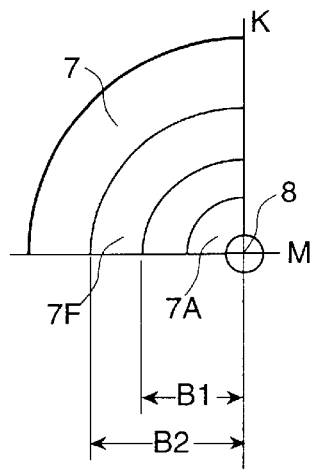

Further, as shown in FIGS. 7C and 7D, through provision of a substantially annular thick portion 7F having thickness of (B2-B1) formed at a distance B1 from the center of the injection hole 8, the vibration noise can be reduced.

Figure 8A:
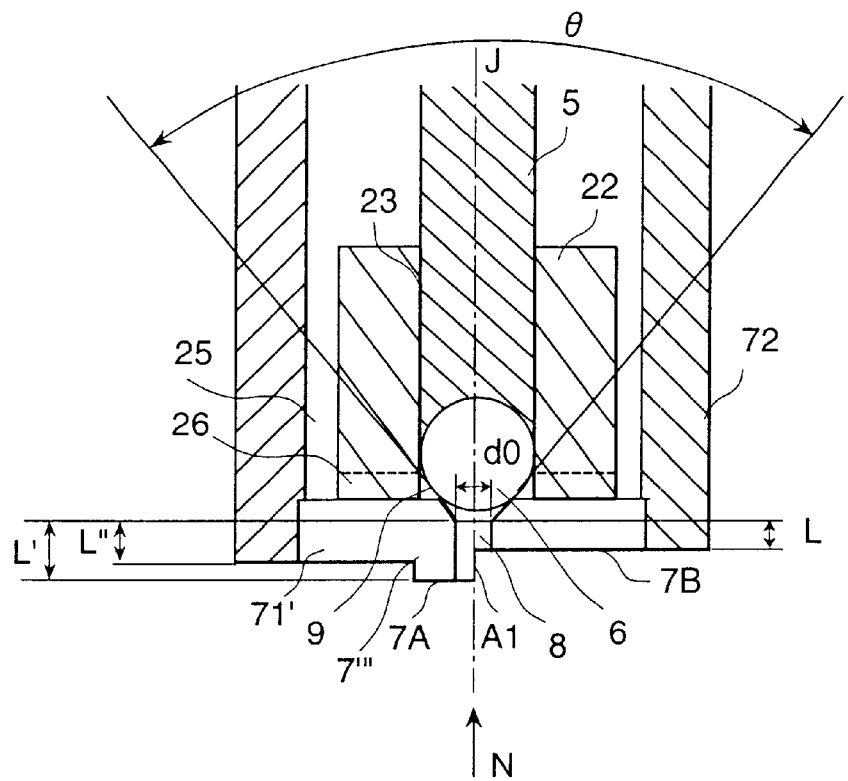
Figure 8B:
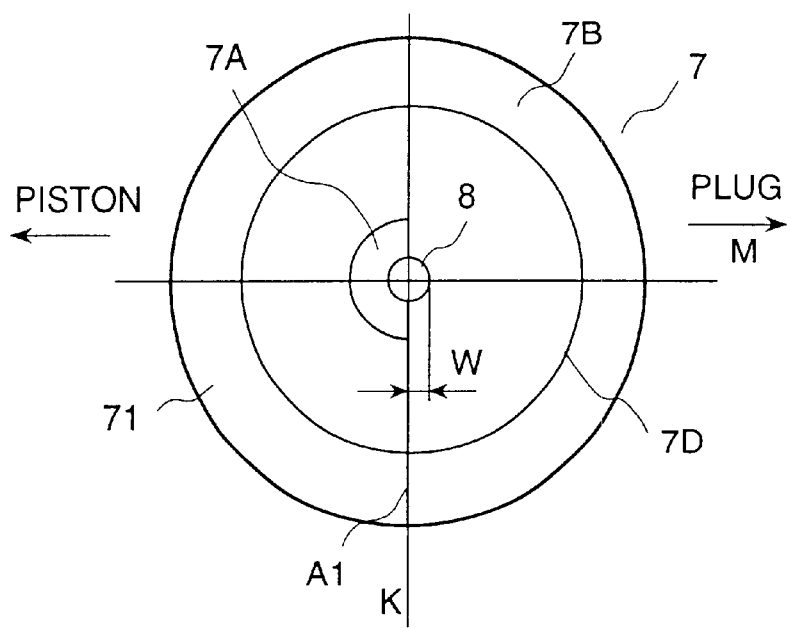

Further, the nozzle member 7 can be constituted as shown in FIGS. 8A and 8B.

A nozzle member 7''' is constituted only by a bottom face portion 71' of a housing which accommodates the fuel swirl element 22 and a part of the valve body 40, and is constituted by a separate body from a side wall portion 72'. The side wall portion 72' constitutes a nozzle guide body for guiding the nozzle member 7'''. The nozzle member 7''' is welded along a joint portion 7D to the side wall portion (nozzle guide body) 72'. Namely, in the present structure, a portion which is to be properly varied depending on an engine volume and an attachment angle of an injection valve is concentrated only at the bottom face portion 71' of the housing, thereby, the productivity thereof is improved.

Figure 9A:
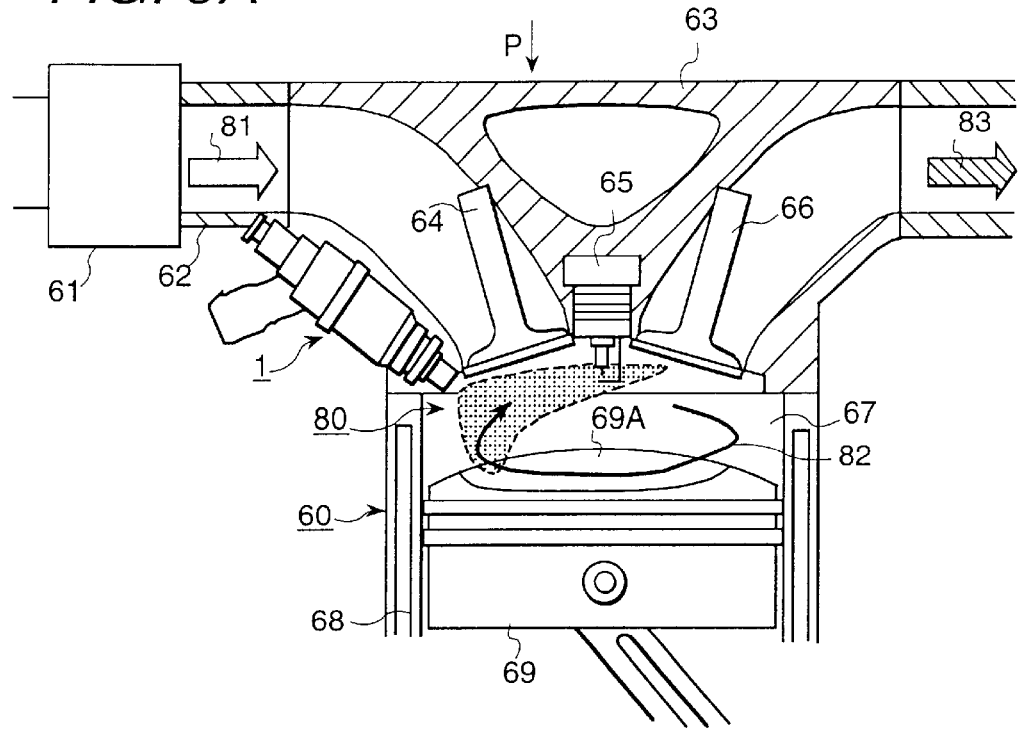
Figure 9B:
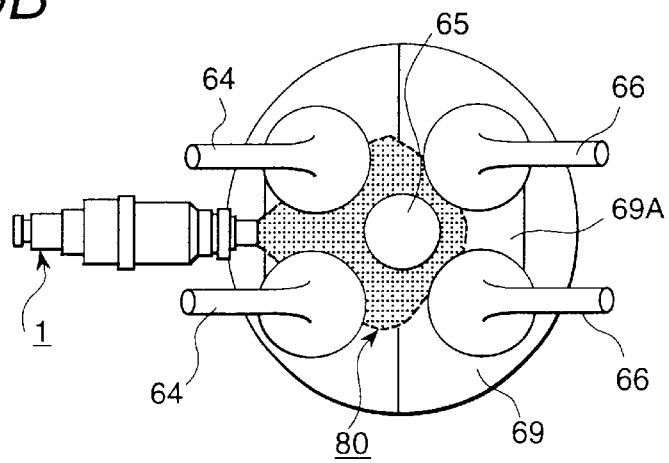
Figure 9C:
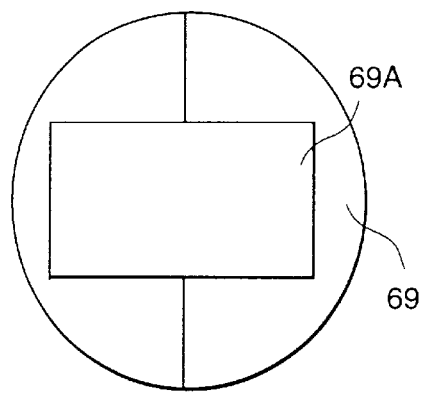

An embodiment of an internal combustion engine will be explained with reference to FIGS. 9A through 9C.

The piston 69 reciprocatively disposed in the cylinder 68 moves up and down in the cylinder 68 in response to rotation of a clank shaft not shown. On the upper portion of the cylinder 68 a cylinder head 63 is mounted to form a closed chamber together with the cylinder 68. In the cylinder head 63, an intake manifold 62 which introduces external air into the cylinder 68 via an intake air flow rate control unit 61 incorporating a throttle valve and an exhaust manifold which introduces combustion gas burnt in the cylinder 68 into an exhaust unit, are formed.

At the side of the intake manifold 62 of the cylinder head 63 intake valves 64 are provided, at the center thereof the ignition unit 65 is provided and at the opposite side of the intake valves 64 exhaust valves 66 are respectively provided. The intake valves 64 and the exhaust valves 66 are disposed in such a manner to extend into the combustion chamber 67. Herein, the fuel injection valve 1 is attached near a connecting portion of the intake manifold 62 in the cylinder head 63, and the axial line of the fuel injection valve 1 is set to direct slightly downward in the combustion chamber 67 (in such a manner that the same is directed to opposite direction with regard to the location of the ignition unit 65). The attachment angle γ thereof is usually about 10°~50°.

Numeral 69 shows the piston, and numeral 69A is a cavity (a recess) provided on the piston 69. The cavity 69A is provided in the radial direction of the piston 69 over a range from the side of the exhaust valves 66 beyond the attachment position of the ignition unit 65 to the side of the intake valves 64 (almost the position of the injection hole 8). The injection hole 8 is directed toward the cavity 69A provided on the piston 69. A blanked arrow 81 in the drawings shows the flow of intake air and a hatched arrow 83 shows the flow of exhaust gas respectively.

The fuel for the internal combustion engine 60 is pressurized by a pump and supplied to the fuel injection valve 1 and is directly injected into the combustion chamber 67 by the fuel injection valve 1 in synchronism with the timing of the intake air, and immediately before the firing thereof, is distributed as shown by the region 80. A mixing of the fuel atomized by the injection with the air flow (tumble flow) 82 introduced via the intake air manifold 62 is promoted in the combustion chamber 67.

The tumble flow 82 flows through the side of the cylinder head 63 to the side of the exhaust valves 66, changes the flow direction below the exhaust valves 66 toward the side of the piston 69, and is introduced to the side of the fuel injection valve 1 along the curved face of the cavity 69A so as to carry the spray upward. The spray deflected toward the ignition unit 65 further directed toward the ignition unit 65 by the tumble flow 82. On the other hand, the spray directed toward the cavity 69A is leaned, thereby, an excess fuel spray toward the piston 69 is prevented. Accordingly, the deposition of the fuel spray on the piston 69 can be reduced. Thereafter, the air fuel mixture is compressed during a compression stroke, is fired stably by the ignition unit 65, thereby, a stable combustion is realized which suppresses an exhaust amount of unburnt gas. Through cutting a part of the spray, a pressure difference between the inside and the outside of the spray is eliminated, thereby, the spray configuration hardly changes in response to a pressure variation inside the cylinder 68, resultantly, a spray can be provided which shows a desirable combustion stability in a broad range of engine rpm.

In the in-cylinder gasoline injection engine, a tumble flow is generated in the combustion chamber, therefore, a combustion of lean air fuel mixture can be realized without significantly modifying the cylinder head configuration of a conventional engine.

According to the fuel injection valves of the above respective embodiments, at an outlet port of the injection hole, through removing a part of a wall face forming the injection hole a restriction to a spray flow is released and a deflecting spray is formed in which the air fuel mixture of combustible density at the side restriction released is rich and that at side restricted the air fuel mixture of combustible density is lean. For this reason, the flow of spray is hardly disturbed as will happen in a case where a part of the injection hole is shielded. The above feature is particularly advantageous when the fuel injection valve injects fuel while applying a swirling force thereto, because the applied swirl energy is hardly dissipated.

Further, the fuel injection valves according to the respective embodiments can be realized by cutting out a part of the wall forming the injection hole at the outlet port thereof, by providing a step at the outlet opening portion of the injection valve so that the length of the injection hole varies in the circumferential direction thereof or by forming a recess at the nozzle top end face including a part of the wall face forming the injection hole. When looking at these embodiments from another point of view, a part of the wall face forming the injection hole is provided by extending toward down stream side (at the top end side of the nozzle body) in comparison with the other portion thereof.

Another embodiment of an internal combustion engine according to the present invention will be explained with reference to FIGS. 10A and 10B.

Figure 10A:
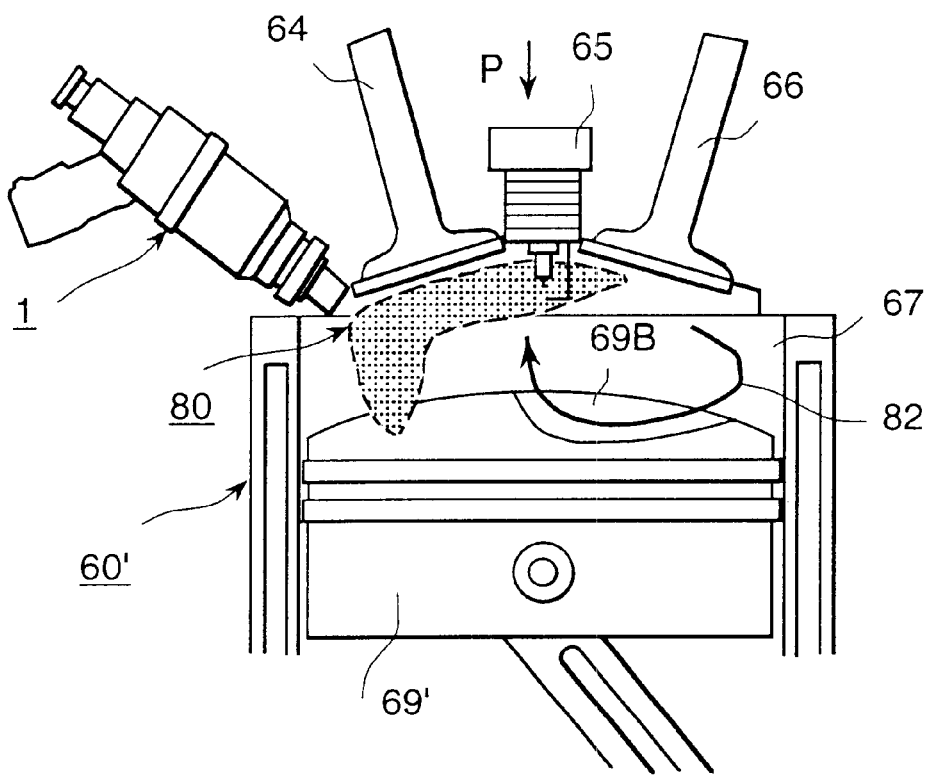

In an internal combustion engine 60' as shown in FIG. 10A, a cavity 69B is provided so that the tumble flow 82 rises up from the position immediately below the ignition unit 65. The cavity 69B is formed on the piston 69' in the radial direction thereof over a range from the side of the exhaust valves 66 rather the attachment position (center portion of the cylinder 68) of the ignition unit 65 to nearly the attachment position of the ignition unit 65. The tumble flow 82 flows along the cylinder head side to the exhaust valves 66, changes its flow direction below the exhaust valves 66 to the piston side, then flows along the curved face of the cavity 69A, and induces a flow directing toward the ignition unit 65 in such a manner to carry the spray upward at the position immediately below the ignition unit 65. Through the tumble flow 82 induced by the cavity 69B a converging property of the air fuel mixture 80 of combustible density toward the ignition unit 65 can be enhanced.

Figure 10B:
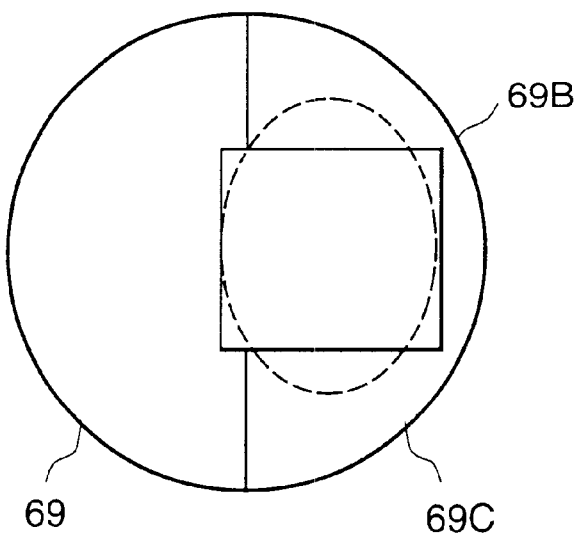

The configuration of the cavity can almost be an oval shape as shown by a dotted line 69C in FIG. 10B.

Still another embodiment of an internal combustion engine according to the present invention will be explained with reference to FIG. 11.

Figure 11:
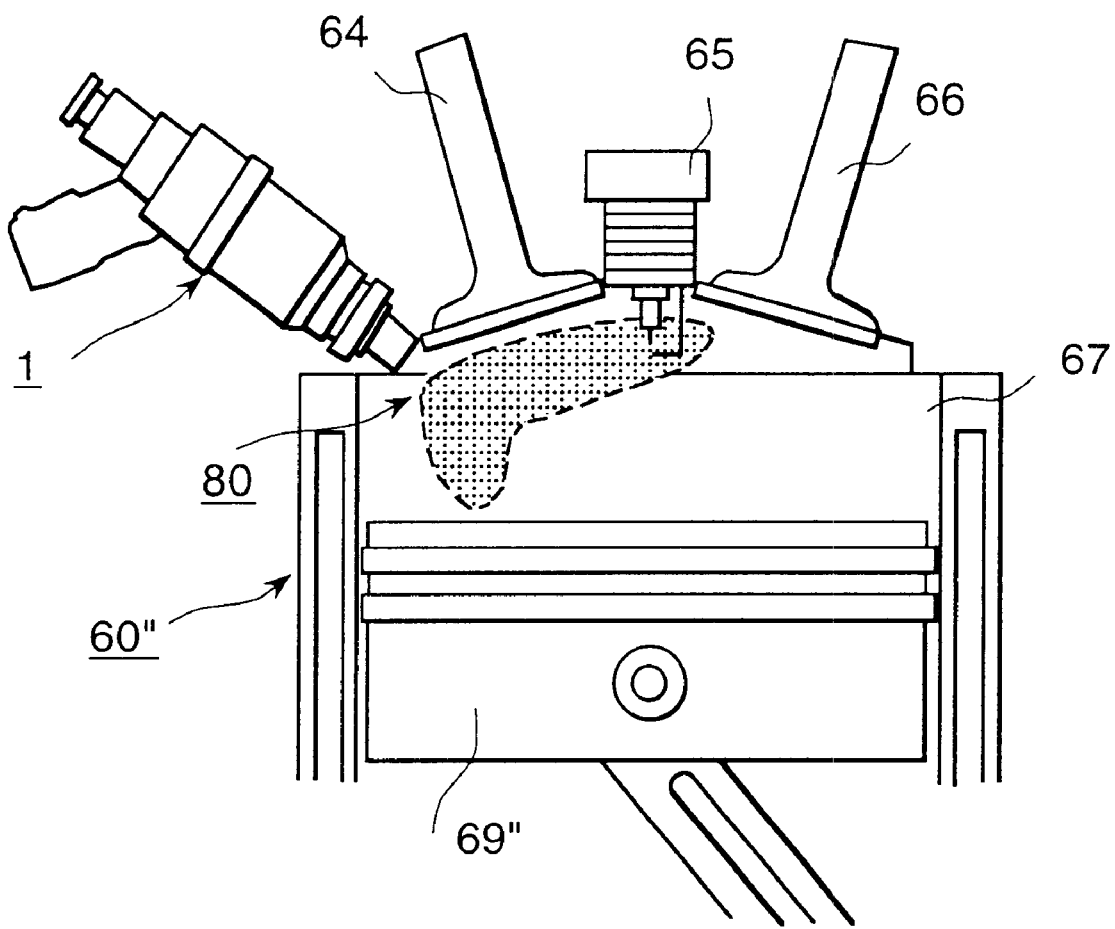
FIG. 11 is a vertical cross sectional view showing still another embodiment of an internal combustion engine according to the present embodiment.

In an internal combustion engine 60" as shown in FIG. 11, a flat piston 69 with no cavity is provided. By setting proper spray angles $\alpha 1$, $\alpha 2$, $\gamma$ and $\alpha u$ and spray expansion Ws by adjusting L, L', L", $d_0$ and W as has been explained in connection with FIG. 2A through FIG. 3C, the air fuel mixture 80 of combustible density can be reached to the ignition unit 65 without using a tumble flow or with a comparatively weak tumble flow.

Figure 12A:
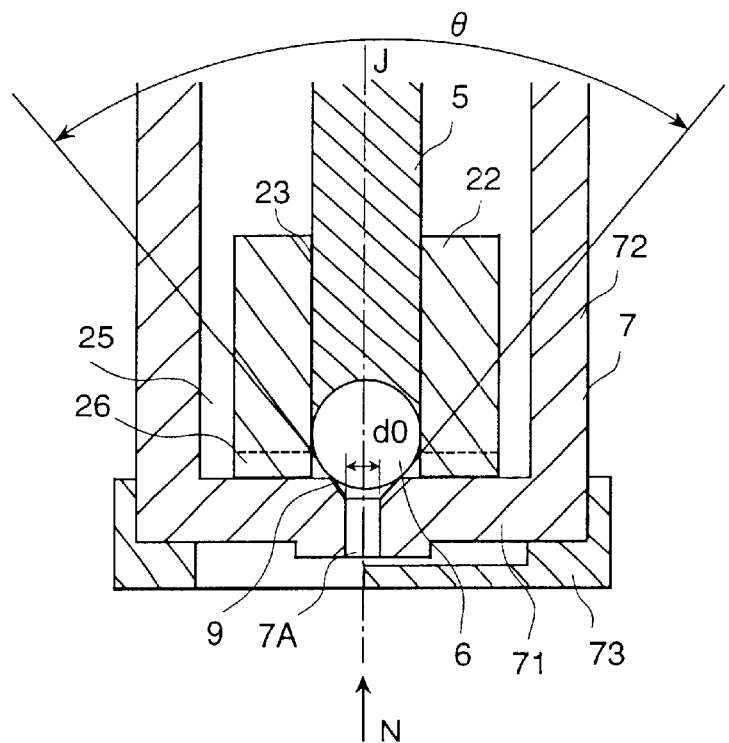
Figure 12B:
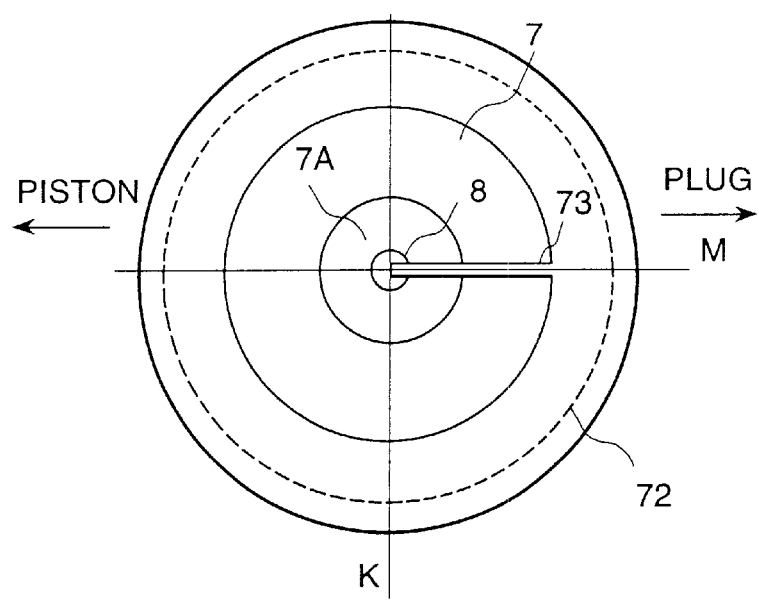

Now, a further embodiment of a fuel injection valve will be explained with reference to FIGS. 12A and 12B. In the nozzle member 7 as shown in FIGS. 12A and 12B, a member 73 which shields a part of a spray is provided at the outlet portion of the injection hole 8. Regardless to configurations of the spray at the upstream side (upward portion from the member 73 in FIGS. 12A and 12B), a part of the spray can be forcedly cut by the member 73. Accordingly, it is expected to increase nozzle design freedom. The member 73 can not necessarily be a separate body.

Figure 13:
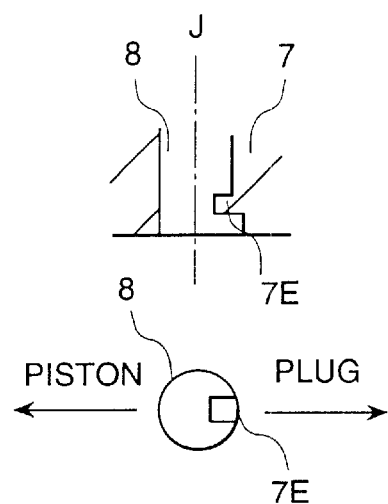
FIG. 13 is a view showing a further embodiment relating to FIGS. 9A, 9B and 9C embodiment and shows a top end portion of an injection hole and a plane view of the injection hole seen from the side of the outlet port.

Further, as shown in FIG. 13, through a provision of a projecting portion 7E in a part inside the injection hole 8 a part of the spray can be cut by shielding a part of the fuel. It is preferable to use plastic working such as press working for forming the projecting portion 7E.

Figure 14:
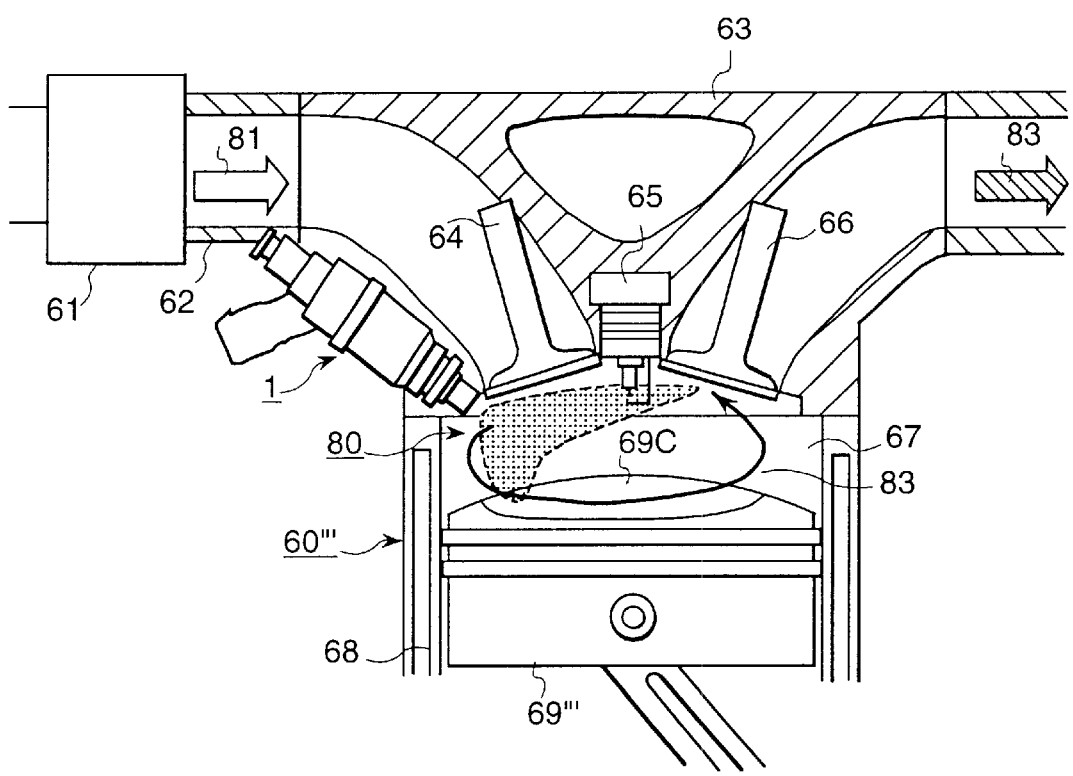
FIG. 14 is a schematic view showing a further embodiment of an internal combustion engine according to the present invention.

A further embodiment of an internal combustion engine will be explained with reference to FIG. 14.

In an internal combustion engine 60''', a cavity 69C is provided for guiding a tumble flow 83 which rotates in opposite direction as in the embodiment explained in connection with FIGS. 9A through 9C. Different point of the present embodiment from FIGS. 9A through 9C embodiment is that when the tumble flow 83 is guided and raised by the cavity 69C and is directed toward the ignition unit 65, since the tumble flow 83 opposes to the air fuel mixture 80, a movement of the air fuel mixture 80 toward the exhaust valves 66 is suppressed, thereby, a fuel deposition on the wall face of the cylinder 68 can be suppressed. Further, since the tumble flow 83 passes between the air fuel mixture 80 and the cavity 69C, a fuel deposition to the piston side is also effectively suppressed.

Now, a further embodiment of a fuel injection valve according to the present invention will be explained with reference to FIGS. 15A and 15B.

Figure 15A:
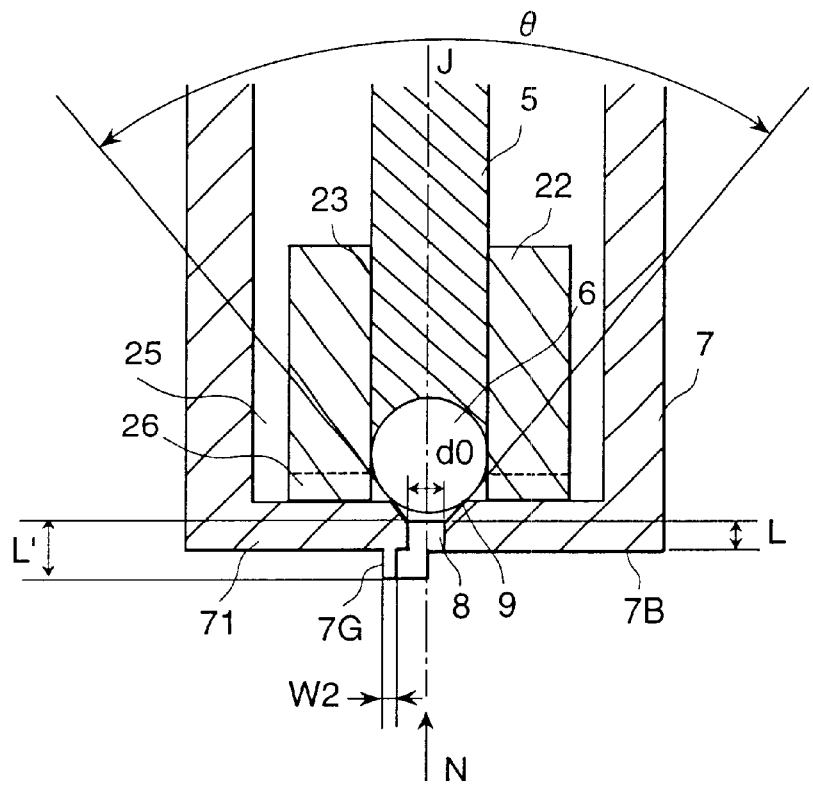
Figure 15B:
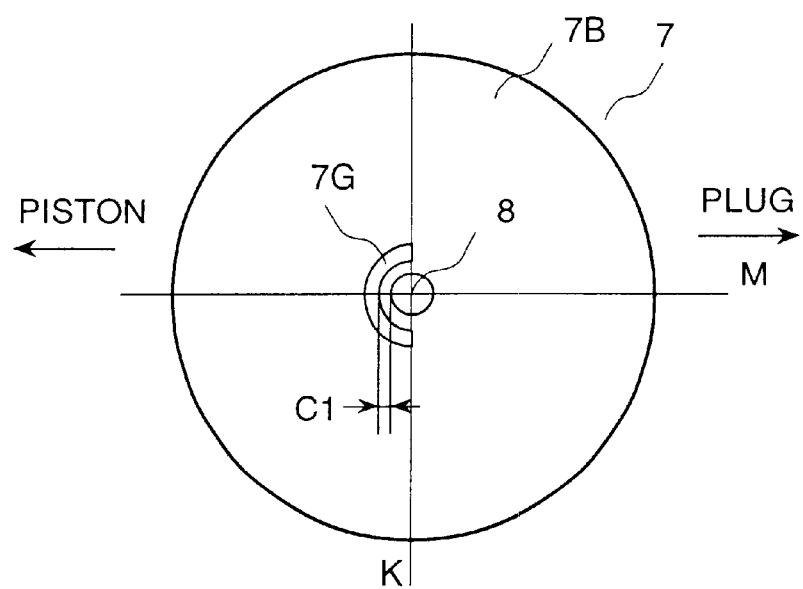

In the nozzle member 7 as shown in FIGS. 15A and 15B, a projection shape wall portion 7G which partially restricts an expansion of a spray is provided at the outlet portion of the injection hole 8. In the present embodiment, with the projection shape wall portion 7G having a width W2 and a height (L'-L) and provided at a distance C1 away from the periphery of the injection hole 8, a spray is deflected and a part of the spray is cut. The deflection amount of the spray (the angles $\alpha 1$ or $\beta$ as shown in FIG. 3A) and the expansion Ws in lateral cross section of the spray (as shown in FIG. 3B) can be adjusted by the width W2 and the height (L'-L). It is preferable to form the projection shape wall portion 7G, for example, by plastic working such as pressing and cutting work. Further, the projection shape wall portion 7G is not necessarily integrated with the nozzle member, but can be formed by welding or press fitting a separate member to the nozzle member 71. Further, in the present embodiment, since the periphery of the injection hole 8 is located away from the projection shape wall portion 7G, a finishing of the periphery portion of the injection hole 8 which is an important processing for a nozzle production can be performed comparatively easy, thereby, productivity thereof is improved.

According to the present invention, through removal of a part of the wall face forming the injection hole at the outlet portion thereof, the restriction of the spray flow is released at the side where the part of the wall portion is removed, thereby, the air fuel mixture converges in this released direction, further, with regard to the spray in the opposite direction, the spray flow is restricted by the wall face forming the injection hole, thereby, the fuel particles are leaned, resultantly, a deflection spray is formed which is hardly collapsed because the pressure difference between inside and outside the spray is reduced.

Further, a spray is formed in an internal combustion engine in such a manner that the air fuel mixture is converged toward the ignition unit and the fuel particles toward the piston are leaned, thereby, the ignition property for the internal combustion engine is improved, and an exhaust amount of unburnt gas components is reduced.

What is claimed is:

1. A fuel injection valve, comprising: a member having an injection hole, a valve seat located in said member at an upstream side of the injection hole, a valve body which performs opening and closing of a fuel passage including said injection hole in cooperation with the valve seat and a driving means for driving the valve body, wherein two cross points, which are formed by a cross sectional plane including the center axial line of the injection hole and disposed in parallel with the center axial line and by the periphery forming an outlet opening of the injection hole, respectively, are offset in the direction of the center axial line so that a sharp step is formed at said periphery forming the outlet opening between one of the cross points and the other.

2. A fuel injection valve according to claim 1, wherein two portions of said periphery forming the outlet opening between the respective cross points and representing corresponding step portions are aligned substantially in parallel when seen from a direction perpendicular to said cross sectional plane.

3. A fuel injection valve according to claim 1, wherein the portions of said periphery forming the outlet opening are formed so as to vary in a direction along the center axial line at the step portions.

4. A fuel injection valve according to claim 2, wherein the two portion of the periphery forming the outlet opening are formed so as to vary in a direction along the center axial line at the step portions.

5. A fuel injection valve according to claim 1, wherein a spray is injected in such a manner that the spray injected from the injection hole comprises a rich spray component around two imaginary sides using the injection hole as their apex on a cross sectional plane including the center axial line of the injection hole and in parallel with the center axial line, and the distance the spray is injected around one side among the two sides is shorter than the distance the spray is injected to the other side, while in the side range where the distance the spray reaches is short, a spray cross sectional plane perpendicular to the center axial line of injection hole contains a fuel lean portion.

6. A fuel injection valve according to claim 1, wherein the fuel passage applies a swirling force to fuel at the upstream side of the valve seat.

7. A fuel injection system comprising a fuel injection valve which operates to inject fuel directly into a cylinder, a pump which pressurizes the fuel and supplies the same to the fuel injection valve and a control unit which controls fuel injection by means of the fuel injection valve, wherein as said fuel injection valve the fuel injection valve according to claim 1 is used.

8. An internal combustion engine comprising a cylinder, a piston which performs a reciprocating motion in the cylinder, an air intake means which introduces air into the cylinder, an exhaust means which exhausts burnt gas from the cylinder, a fuel injection valve which directly injects fuel into the cylinder and an ignition unit which ignites a mixture gas formed of the air introduced into the cylinder by the air intake means and the fuel injected into the cylinder by the fuel injection valve, wherein as said fuel injection valve the fuel injection valve according to claim 1 is used, and the fuel injection valve is arranged in such a manner that a shortened portion of a passage wall forming the injection hole through provision of a step is directed to the side of the ignition unit.

9. An internal combustion engine according to claim 8, wherein a deflection spray is formed in which the spray is rich at the side of the ignition unit and the spray is lean at the side of the piston.

10. A fuel injection valve, comprising: a member having an injection hole, a valve seat located at an upstream side of the injection hole, a valve body which performs opening and closing of a fuel passage including said injection hole in cooperation with the valve seat and a driving means for driving the valve body, wherein an outlet port face of the injection hole is formed so as to include a sharp step in the center axial direction of the injection hole.

11. A fuel injection valve according to claims 10, wherein a spray is injected in such a manner that the spray injected from the injection hole comprises a rich spray component around two imaginary sides using the injection hole as their apex on a cross sectional plane including the center axial line of the injection hole and in parallel with the center axial line, and the distance the spray is injected around one side among the two sides is shorter than the distance the spray is injected to the other side, while in the side range where the distance the spray is short, a spray cross sectional plane perpendicular to the center axial line of injection hole contains a fuel lean portion.

12. A fuel injection valve according to claim 10, wherein the fuel passage applies a swirling force to fuel at the upstream side of the valve seat.

13. A fuel injection system comprising a fuel injection valve which operates to inject fuel directly into a cylinder, a pump which pressurizes the fuel and supplies the same to the fuel injection valve and a control unit which controls fuel injection by means of the fuel injection valve, wherein as said fuel injection valve the fuel injection valve according to claim 10 is used.

14. An internal combustion engine comprising a cylinder, a piston which performs a reciprocating motion in the cylinder, an air intake means which introduces air into the cylinder, an exhaust means which exhausts burnt gas from the cylinder, a fuel injection valve which directly injects fuel into the cylinder and an ignition unit which ignites a mixture gas formed of the air introduced into the cylinder by the air intake means and the fuel injected into the cylinder by the fuel injection valve, wherein as said fuel injection valve the fuel injection valve according to claim 10 is used, and the fuel injection valve is arranged in such a manner that a shortened portion of a passage wall forming the injection hole through the provision of the step is directed to the side of the ignition unit.

15. An internal combustion engine according to claim 14, wherein a deflection spray is formed in which the spray is rich at the side of the ignition unit and the spray is lean at the side of the piston.

16. A fuel injection valve, comprising: a member having an injection hole, a valve seat located at an upstream side of the injection hole, a valve body which performs opening and closing of a fuel passage including said injection hole in cooperation with the valve seat and a driving means for driving the valve body, wherein a sharp step is provided at an outlet opening portion of the injection hole so that the length of a passage wall forming the injection hole varies nonlinearly in the circumferential direction of the injection hole.

17. A fuel injection valve according to claim 16, wherein a spray is injected in such a manner that the spray injected from the injection hole comprises a rich spray component around two imaginary sides using the injection hole as their apex on a cross sectional plane including the center axial line of the injection hole and in parallel with the center axial line, and the distance the spray is injected around one side among the two sides is shorter than the distance the spray is injected to the other side, while in the side range where the distance the spray reaches is short, a spray cross sectional plane perpendicular to the center axial line of injection hole contains a fuel lean portion.

18. A fuel injection valve according to claim 16, wherein the fuel passage applies a swirling force to fuel at the upstream side of the valve seat.

19. A fuel injection system comprising a fuel injection valve which operates to inject fuel directly into a cylinder, a pump which pressurizes the fuel and supplies the same to the fuel injection valve and a control unit which controls fuel injection by means of the fuel injection valve, wherein as said fuel injection valve the fuel injection valve according to claim 16 is used.

20. An internal amount combustion engine comprising a cylinder, a piston which performs a reciprocating motion in the cylinder, an air intake means which introduces air into the cylinder, an exhaust means which exhausts burnt gas from the cylinder, a fuel injection valve which directly injects fuel into the cylinder and an ignition unit which ignites a mixture gas formed of the air introduced into the cylinder by the air intake means and the fuel injected into the cylinder by the fuel injection valve, wherein as said fuel injection valve the fuel injection valve according to claim 16 is used, and the fuel injection valve is arranged in such a manner that a shortened portion of the passage wall forming the injection hole through the provision of the step is directed to the side of the ignition unit.

21. An internal combustion engine according to claim 20, wherein a deflection spray is formed in which the spray is rich at the side of the ignition unit and the spray is lean at the side of the piston.

22. A fuel injection valve, comprising: a member having an injection hole, a valve seat located at an upstream side of the injection hole, a valve body which performs opening and closing of a fuel passage including said injection hole in cooperation with the valve seat and a driving means for driving the valve body, wherein at an outlet opening of the injection hole, a cutting substantially in parallel with the center axial line of the injection hole is formed, and, through removing a wall face of one side with respect to the cutting, a sharp step is formed.

23. A fuel injection valve according to claim 22, wherein a spray is injected in such a manner that the spray injected from the injection hole comprises a rich spray component around two imaginary sides using the injection hole as their apex on a cross sectional plane including the center axial line of the injection hole and in parallel with the center axial line, and the distance the spray is injected around one side among the two sides is shorter than the distance the spray is injected to the other side, while in the side range where the distance the spray reaches is short, a spray cross sectional plane perpendicular to the center axial line of injection hole contains a fuel lean portion.

24. A fuel injection system comprising a fuel injection valve which operates to inject fuel directly into a cylinder, a pump which pressurizes the fuel and supplies the same to the fuel injection valve and a control unit which controls fuel injection by means of the fuel injection valve, wherein as said fuel injection valve the fuel injection valve according to claim 22 is used.

25. An internal amount combustion engine comprising a cylinder, a piston which performs a reciprocating motion in the cylinder, an air intake means which introduces air into the cylinder, an exhaust means which exhausts burnt gas from the cylinder, a fuel injection valve which directly injects fuel into the cylinder and an ignition unit which ignites a mixture gas formed of the air introduced into the cylinder by the air intake means and the fuel injected into the cylinder by the fuel injection valve, wherein as said fuel injection valve the fuel injection valve according to claim 22 is used, and the fuel injection valve is arranged in such a manner that a shortened portion of the passage wall forming the injection hole through the provision of the step is directed to the side of the ignition unit.

26. An internal combustion engine according to claim 25, wherein a deflection spray is formed in which the spray is rich at the side of the ignition unit and the spray is lean at the side of the piston.

27. A fuel injection valve according to claim 22, wherein the fuel passage applies a swirling force to fuel at the upstream side of the valve seat.

28. A fuel injection valve, comprising: a member having an injection hole, a valve seat located at an upstream side of the injection hole, a valve body which performs opening and closing of a fuel passage including said injection hole in cooperation with the valve seat and a driving means for driving the valve body, wherein through formation of a step at a nozzle top end face where an outlet opening of the injection hole is formed, the step is formed at the outlet opening face.

29. A fuel injection valve according to claim 28, wherein a spray is injected in such a manner that the spray injected from the injection hole comprises a rich spray component around two imaginary sides using the injection hole as their apex on a cross sectional plane including the center axial line of the injection hole and in parallel with the center axial line, and the distance the spray is injected around one side among the two sides is shorter than the distance the spray is injected to the other side, while in the side range where the distance the spray reaches is short, a spray cross sectional plane perpendicular to the center axial line of injection hole contains a fuel lean portion.

30. A fuel injection valve according to claim 28, wherein the fuel passage applies a swirling force to fuel at the upstream side of the valve seat.

31. A fuel injection system comprising a fuel injection valve which operates to inject fuel directly into a cylinder, a pump which pressurizes the fuel and supplies the same to the fuel injection valve and a control unit which controls fuel injection by means of the fuel injection valve, wherein as said fuel injection valve the fuel injection valve according to claim 28 is used.

32. An internal amount combustion engine comprising a cylinder, a piston which performs a reciprocating motion in the cylinder, an air intake means which introduces air into the cylinder, an exhaust means which exhausts burnt gas from the cylinder, a fuel injection valve which directly injects fuel into the cylinder and an ignition unit which ignites a mixture gas formed of the air introduced into the cylinder by the air intake means and the fuel injected into the cylinder by the fuel injection valve, wherein as said fuel injection valve the fuel injection valve according to claim 28 is used, and the fuel injection valve is arranged in such a manner that a shortened portion of a passage wall forming the injection hole through the provision of the step is directed to the side of the ignition unit.

33. An internal combustion engine according to claim 32, wherein a deflection spray is formed in which the spray is rich at the side of the ignition unit and the spray is lean at the side of the piston.

34. A fuel injection valve, comprising: a member having an injection hole, a valve seat located at an upstream side of the injection hole, a valve body which performs opening and closing of a fuel passage including said injection hole in cooperation with the valve seat and a driving means for driving the valve body, wherein at a periphery forming an outlet opening of the injection hole, a sharp step is formed in the center axial direction of the injection hole so that length of a passage wall face forming the injection hole varies in the circumferential direction of the injection hole and fuel is injected while being provided at a pressure of 1.0–20 MPa at a fuel inlet portion of said first passage in the fuel injection valve.

35. A fuel injection valve according to claim 34, wherein a spray is injected in such a manner that the spray injected from the injection hole comprises a rich spray component around two imaginary sides using the injection hole as their apex on a cross sectional plane including the center axial line of the injection hole and in parallel with the center axial line, and the distance the spray is injected around one side among the two sides is shorter than the distance the spray is injected to the other side, while in the side range where the distance the spray reaches is short, a spray cross sectional plane perpendicular to the center axial line of injection hole contains a fuel lean portion.

36. A fuel injection valve according to claim 34, wherein the fuel passage applies a swirling force to fuel at the upstream side of the valve seat.

37. A fuel injection system comprising a fuel injection valve which operates to inject fuel directly into a cylinder, a pump which pressurizes the fuel and supplies the same to the fuel injection valve and a control unit which controls fuel injection by means of the fuel injection valve, wherein as said fuel injection valve the fuel injection valve according to claim 34 is used.

38. An internal amount combustion engine comprising a cylinder, a piston which performs a reciprocating motion in the cylinder, an air intake means which introduces air into the cylinder, an exhaust means which exhausts burnt gas from the cylinder, a fuel injection valve which directly injects fuel into the cylinder and an ignition unit which ignites a mixture gas formed of the air introduced into the cylinder by the air intake means and the fuel injected into the cylinder by the fuel injection valve, wherein as said fuel injection valve the fuel injection valve according to claim 34 is used, and the fuel injection valve is arranged in such a manner that a shortened portion of the passage wall forming the injection hole through the provision of the step is directed to the side of the ignition unit.

39. An internal combustion engine according to claim 38, wherein a deflection spray is formed in which the spray is rich at the side of the ignition unit and the spray is lean at the side of the piston.

40. A fuel injection valve, comprising: a member having an injection holder a valve seat located at an upstream side of the injection hole, a valve body which performs opening and closing of a fuel passage including said injection hole in cooperation with the valve seat and a driving means for driving the valve body, wherein a spray is injected in such manner that, by varying the length of a passage wall face forming the injection hole in the circumferential direction of the injection holder to provide a sharp step between adjacent portions of the passage wall face, the angle of the spray with respect to the center axial line of the injection hole is enlarged, the distance the spray reaches is greater at a shorter side of the passage wall face length than at a longer side thereof, and in a region where the spray reaches the shortest distance, a cross section of the spray in a plane perpendicular to the center axial line of the injection hole includes a lean portion.

41. A fuel injection valve according to claim 40, wherein the fuel passage applies a swirling force to fuel at the upstream side of the valve seat.

42. A fuel injection system comprising a fuel injection valve which operates to inject fuel directly into a cylinder, a pump which pressurizes the fuel and supplies the same to the fuel injection valve and a control unit which controls fuel injection by means of the fuel injection valve, wherein as said fuel injection valve the fuel injection valve according to claim 40 is used.

43. An internal combustion engine comprising a cylinder, a piston which performs a reciprocating motion in the cylinder, an air intake means which introduces air into the cylinder, an exhaust means which exhausts burnt gas from the cylinder, a fuel injection valve which directly injects fuel into the cylinder and an ignition unit which ignites a mixture gas formed of the air introduced into the cylinder by the air intake means and the fuel injected into the cylinder by the fuel injection valve, and said fuel injection valve comprising, an injection hole, a valve seat located at an upstream side of the injection hole, a valve body which performs opening and closing of a fuel passage in corporation with the valve seat and a driving means for driving the valve body, wherein as said fuel injection valve the fuel injection valve according to claim 40 is used, and the fuel injection valve is arranged in such a manner that a spray having a larger spray angle is formed at the side of the ignition unit and a lean portion of the spray is formed at the side of the piston.

44. A fuel injection valve, comprising: a member having an injection hole, a valve seat located at an upstream side of the injection hole, a valve body which performs opening and closing of a fuel passage including the injection hole in cooperation with the valve seat and a driving means for driving the valve body, wherein a spray is injected in such a manner that, by varying the length of a spray restriction in a circumferential direction of the injection hole to provide a sharp step in the length of the spray restriction, the angle of the spray with respect to the center axial line of the injection hole is enlarged, the distance the spray reaches is greater at a shorter restriction side than at a longer restriction side, and in a region where the spray reaches the shortest distance, a cross section of the spray in a plane perpendicular to the center axial line of the injection hole includes a lean portion.

45. A fuel injection valve according to claim 44, wherein the fuel passage applies a swirling force to fuel at the upstream side of the valve seat.

46. A fuel injection system comprising a fuel injection valve which operates to inject fuel directly into a cylinder, a pump which pressurizes the fuel and supplies the same to the fuel injection valve and a control unit which controls fuel injection by means of the fuel injection valve, wherein as said fuel injection valve the fuel injection valve according to claim 44 is used.

47. An internal combustion engine comprising a cylinder, a piston which performs a reciprocating motion in the cylinder, an air intake means which introduces air into the cylinder, an exhaust means which exhausts burnt gas from the cylinder, a fuel injection valve which directly injects fuel into the cylinder and an ignition unit which ignites a mixture gas formed of the air introduced into the cylinder by the air intake means and the fuel injected into the cylinder by the fuel injection valve, and said fuel injection valve comprising, an injection hole, a valve seat located at an upstream side of the injection hole, a valve body which performs opening and closing of a fuel passage in corporation with the valve seat and a driving means for driving the valve body, wherein as said fuel injection valve the fuel injection valve according to claim 44 is used, and the fuel injection valve is arranged in such a manner that a spray having a larger spray angle is formed at the side of the ignition unit and a lean portion of the spray is formed at the side of the piston.

48. A method of injecting fuel into a cylinder through an injection hole of a fuel injection valve, wherein a spray is injected by varying the length of a passage wall face forming the injection hole in the circumferential direction of the injection hole to provide a sharp step between adjacent portions of the passage wall face, so that a spray angle with respect to the center axial line of the injection hole is enlarged, the distance the spray reaches is greater at a shorter restriction side than at a longer restriction side, and in a region where the spray reaches the shortest distance, a cross section of the spray in a plane perpendicular to the center axial line of the injection hole includes a lean portion.

49. A fuel injection valve, comprising: a member having an injection hole, a valve seat located at an upstream side of the injection hole, a valve body which performs opening and closing of a fuel passage including the injection hole in cooperation with the valve seat and a driving means for driving the valve body, wherein the injection hole includes an outlet portion in a face plane surface of the fuel injection valve, said fuel injection valve further comprising a wall portion projecting from said face plane surface, said wall portion including a sharp step adjacent said injection hole.

50. A fuel injection valve according to claim 49, wherein said wall portion is formed adjacent to and spaced apart from the outlet portion of the injection hole in said face plane surface so that a portion of said face plane surface separates a periphery of said outlet portion of said injection hole in said face plane surface from said wall portion.

51. A fuel injection valve according to claim 50, wherein said wall portion includes a wall surface facing said outlet portion of said injection hole in said face plane surface, wherein said wall surface forms a semi-circle around said outlet portion.

52. A fuel injection valve according to claim 51, wherein said wall surface is substantially equally spaced along said semi-circle from the periphery of the outlet portion of said injection hole of said face plane surface.

53. A fuel injection valve according to claim 51, wherein said semi-circle surrounds substantially half of the periphery of the outlet portion of the injection hole.

54. A fuel injection valve according to claim 52, wherein said semi-circle surrounds substantially half of the periphery of the outlet portion of the injection hole.

55. A fuel injection valve, comprising: a member having an injection hole, a valve seat located at an upstream side of the injection hole, a valve body which performs opening and closing of a fuel passage including the injection hole in cooperation with the valve seat and a driving means for driving the valve body, wherein the injection hole includes an outlet portion in a face plane surface of the fuel injection valve, said fuel injection valve further comprising means formed on said face plane surface for non-linearly restricting the expansion of a fuel spray emerging from said outlet portion of said injection hole.

56. A fuel injection valve according to claim 55, wherein said means is formed adjacent to and spaced apart from the outlet portion of the injection hole in said face plane surface so that a portion of said face plane surface separates a periphery of said outlet portion of said injection hole in said face plane surface from said means.

57. A fuel injection valve according to claim 56, wherein said means includes a wall surface facing said outlet portion of said injection hole in said face plane surface, wherein said wall surface forms a semi-circle around said outlet portion.

58. A fuel injection valve according to claim 57, wherein said wall surface is substantially equally spaced along said semi-circle from the periphery of the outlet portion of said injection hole of said face plane surface.

59. A fuel injection valve according to claim 57, wherein said semi-circle surrounds substantially half of the periphery of the outlet portion of the injection hole.

60. A fuel injection valve according to claim 58, wherein said semi-circle surrounds substantially half of the periphery of the outlet portion of the injection hole.

61. A fuel injection valve, comprising: a member having an injection hole, a valve seat located at an upstream side of the injection hole, a valve body which performs opening and closing of a fuel passage including the injection hole in cooperation with the valve seat and a driving means for driving the valve body, wherein the injection hole includes an outlet portion in a face plane surface of the fuel injection valve, said fuel injection valve further comprising a wall portion projecting from said face plane surface to nonlinearly restrict the expansion of a fuel spray emerging from said outlet portion of said injection hole.

62. A fuel injection valve according to claim 61, wherein said wall portion is formed adjacent to and spaced apart from the outlet portion of the injection hole in said face plane surface so that a portion of said face plane surface separates a periphery of said outlet portion of said injection hole in said face plane surface from said wall portion.

63. A fuel injection valve according to claim 62, wherein the deflection of said spray can be controlled by adjusting the height of said wall portion.

64. A fuel injection valve, comprising: a member having an injection hole, a valve seat located at an upstream side of the injection hole, a valve body which performs opening and closing of a fuel passage including the injection hole in cooperation with the valve seat and a driving means for driving the valve body, wherein the injection hole includes an outlet portion in a face plane surface of the fuel injection valve, said fuel injection valve further comprising means formed on said face plane surface for non-linearly restricting the expansion of a fuel spray emerging from said outlet portion of said injection hole.

65. A fuel injection valve which injects fuel through opening and closing a fuel passage upstream of an injection hole comprising: a restriction portion formed in the circumferential direction of an outlet portion of the injection hole which non-linearly restricts fuel flow in a direction crossing a valve axis of a fuel spray injected from the injection hole, and a nonrestricted releasing portion, wherein a fuel spray including a portion having lean fuel particles associating with the restricting portion and a portion having rich fuel particles associating with the releasing portion is caused when viewed at an injection spray cross section crossing the valve axis.

* * * * *